(12) United States Patent
Yoshinaga et al.

(10) Patent No.: US 11,007,598 B2
(45) Date of Patent: May 18, 2021

(54) SPOT WELDING METHOD

(71) Applicant: NIPPON STEEL & SUMITOMO METAL CORPORATION, Tokyo (JP)

(72) Inventors: Chisato Yoshinaga, Tokyo (JP); Yasunobu Miyazaki, Tokyo (JP); Kunio Hayashi, Tokyo (JP); Hiroyuki Kawata, Tokyo (JP); Masanori Yasuyama, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 487 days.

(21) Appl. No.: 15/756,351

(22) PCT Filed: Sep. 2, 2016

(86) PCT No.: PCT/JP2016/075839
§ 371 (c)(1),
(2) Date: Feb. 28, 2018

(87) PCT Pub. No.: WO2017/038981
PCT Pub. Date: Mar. 9, 2017

(65) Prior Publication Data
US 2018/0243853 A1 Aug. 30, 2018

(30) Foreign Application Priority Data

Sep. 3, 2015 (JP) .............................. JP2015-173665
Sep. 3, 2015 (JP) .............................. JP2015-173749

(51) Int. Cl.
*B23K 11/11* (2006.01)
*B23K 11/24* (2006.01)
*B23K 11/16* (2006.01)

(52) U.S. Cl.
CPC ........... *B23K 11/115* (2013.01); *B23K 11/163* (2013.01); *B23K 11/24* (2013.01)

(58) Field of Classification Search
CPC ..... B23K 11/115; B23K 11/163; B23K 11/24; B23K 11/11; B23K 11/16
See application file for complete search history.

(56) References Cited

U.S. PATENT DOCUMENTS 4,365,134 A * 12/1982 Eagar .................... B23K 11/16
219/118
8,785,807 B2 * 7/2014 Vanimisetti ........ B23K 11/3018
219/117.1
(Continued)

FOREIGN PATENT DOCUMENTS

CA  103111741 A  5/2013
CN  102596481 A  7/2012
(Continued)

OTHER PUBLICATIONS

International Search Report for PCT/JP2016/075839 dated Oct. 25, 2016.
(Continued)

*Primary Examiner* — Paul R Durand
*Assistant Examiner* — Randall A Gruby
(74) *Attorney, Agent, or Firm* — Birch, Stewart, Kolasch & Birch, LLP

(57) ABSTRACT

The present invention provides a spot welding method for a member to be welded constituted of a plurality of steel sheets that are overlapped with each other at at least a welding zone, in which at least an overlapped face of at least one of the plurality of steel sheets at the welding zone is coated with zinc plating, a total sheet thickness t (mm) of the plurality of steel sheets is 1.35 mm or more, a squeeze time St (seconds) from the time when welding electrodes are brought into contact with the member to be welded to the time when electric current flow for welding starts satisfies "0.020≤St", and a hold time Ht( seconds) after welding from the time when electric current flow for welding between the (Continued)

welding electrodes ends to the time when the welding electrodes and the member to be welded are brought out of contact satisfies "$0.015t^2+0.020 \leq Ht$".

16 Claims, 6 Drawing Sheets

(56) References Cited

U.S. PATENT DOCUMENTS

| | | | |
|---|---|---|---|
| 9,475,147 B2* | 10/2016 | Taniguchi | B23K 11/24 |
| 9,662,738 B2* | 5/2017 | Vanimisetti | B23K 11/3018 |
| 10,675,701 B2* | 6/2020 | Yang | B32B 15/011 |
| 10,717,148 B2* | 7/2020 | Nicewonger | H05K 7/20 |
| 10,766,095 B2* | 9/2020 | Wang | B23K 11/115 |
| 2003/0192863 A1 | 10/2003 | Wang et al. | |
| 2011/0272384 A1* | 11/2011 | Matsushita | B23K 11/115 219/91.2 |
| 2012/0129006 A1 | 5/2012 | Kanai et al. | |
| 2013/0020288 A1 | 1/2013 | Moision et al. | |
| 2013/0327745 A1* | 12/2013 | Chen | B23K 11/115 219/117.1 |
| 2015/0174690 A1* | 6/2015 | Furusako | B23K 11/115 219/91.22 |
| 2015/0352659 A1* | 12/2015 | Sigler | B23K 11/36 219/91.2 |
| 2016/0045978 A1* | 2/2016 | Wang | B23K 20/10 219/91.2 |
| 2016/0082543 A1* | 3/2016 | Wakabayashi | B23K 11/115 219/86.31 |
| 2016/0158874 A1* | 6/2016 | Wang | B23K 11/115 219/91.2 |
| 2017/0008118 A1* | 1/2017 | Yang | B23K 37/003 |
| 2018/0257165 A1* | 9/2018 | Sawanishi | B23K 11/16 |
| 2018/0304396 A1* | 10/2018 | Yoshinaga | B23K 11/24 |
| 2019/0001429 A1* | 1/2019 | Sawanishi | B23K 11/115 |
| 2019/0201999 A1* | 7/2019 | Takashima | C22C 38/28 |
| 2019/0240768 A1* | 8/2019 | Furusako | B23K 11/255 |
| 2019/0321907 A1* | 10/2019 | Lei | B23K 11/11 |
| 2020/0101557 A1* | 4/2020 | Ishizaki | B23K 11/312 |
| 2020/0116767 A1* | 4/2020 | Stolze | B23K 11/253 |
| 2020/0130097 A1* | 4/2020 | Kitamura | B23K 11/20 |
| 2020/0156179 A1* | 5/2020 | Hioki | B23B 5/166 |

FOREIGN PATENT DOCUMENTS

| | | |
|---|---|---|
| CN | 104661784 A | 5/2015 |
| JP | 5-277552 A | 10/1993 |
| JP | 2001-9573 A | 1/2001 |
| JP | 2004-276058 A | 10/2004 |
| JP | 2006-265671 A | 10/2006 |
| JP | 2008-36672 A | 2/2008 |
| JP | 2008-231493 A | 10/2008 |
| JP | 2012-192455 A | 10/2012 |
| JP | 5418726 B1 | 2/2014 |
| KR | 10-2011-0071941 A | 6/2011 |
| RU | 2243071 C2 | 12/2004 |
| TW | 201509575 A | 3/2015 |
| WO | WO 2014/196499 A1 | 12/2014 |

OTHER PUBLICATIONS

Office Action for TW 105128399 dated Aug. 8, 2017.
Written Opinion of the International Searching Authority for PCT/JP2016/075839 (PCT/ISA/237) dated Oct. 25, 2016.
Extended European Search Report dated Apr. 1, 2019; for counterpart European Application No. 16842010.7.
Chinese Office Action and Search Report dated Aug. 16, 2019, for counterpart Chinese Application No. 201680050588.9, with partial English translation.
Russian Office Action and Search Report, dated Nov. 27, 2018, for counterpart Russian Application No. 2018109479/02, with an English translation.

* cited by examiner

SPOT WELDING METHOD

TECHNICAL FIELD OF THE INVENTION

The present invention relates to a spot welding method for a plurality of steel sheets including a zinc-plated steel sheet.

RELATED ART

In recent years, in an automobile field, there have been demands-to reduce the weight of the vehicle body with the aim of improving fuel efficiency and reducing an emission amount of $CO_2$ and to increase the strength of vehicle body members with the aim of improving collision safety. In order to satisfy the demands, it is effective to use high strength steel sheets for members for a vehicle body, various components, and the like.

In addition, from the viewpoint of improving antirust properties of a vehicle body, it is required to constitute members of steel sheets having excellent corrosion resistance. It is widely known that zinc-plated steel sheets have good corrosion resistance. From the above viewpoint of reducing the weight and increasing the strength, for zinc-plated steel sheets used for automobiles, high strength zinc-plated steel sheets using high strength steel sheets for the plated steel sheets are used.

In processes of assembling the vehicle body, attaching the components, and the like, spot welding is mainly used. However, in a case where high-strength zinc-plated steel sheets are spot-welded, there is a problem of the occurrence of cracking from the outer surface of the steel sheets in contact with welding electrodes to a nugget. FIG. 1 schematically shows cracking at a welding zone in a case where zinc-plated steel sheets are spot-welded. It is known that in a case where zinc-plated steel sheets 1 are spot-welded, cracking 3 that propagates from outer surfaces of the steel sheets 1 in contact with the welding electrodes to a nugget 2, and cracking 5 that propagates from electrode shoulder portions to a heat affected zone 4 occur.

Such cracking is said to be cracking due to so-called liquid metal embrittlement. It is said that by applying the welding pressure of the electrodes or tensile stress due to thermal expansion or contraction of the steel sheets to the welding zone, zinc or an alloy of zinc and copper of the electrodes melt on the steel sheet surface at the welding zone intrudes into the grain boundaries of the steel sheets and decreases the grain boundary strength. In vehicle bodies of automobiles, in a case where cracking at the welding zone is remarkable, there is a problem of a decrease in strength. There are known techniques for suppressing cracking at a welding zone by controlling the composition or the microstructure of the steel sheets.

For example, Patent Document 1 discloses a technique of adjusting the composition of steel sheets, rendering an austenite phase formed at the time of spot welding to fine grains, and complicatedly incorporating the grains of austenite phase into grains of other phases in the metallographic structure so as to thereby make the paths for diffusion and penetration of molten zinc to the grain boundaries complicated and make it difficult for molten zinc to intrude and thus prevent liquid metal embrittlement cracking at the time of spot welding.

Further, Patent Document 2 discloses that by merely making the grain boundaries more complicated by controlling the micro composition of the steel sheets, it is not possible to sufficiently suppress the occurrence of cracking at a welded portion. In Patent Document 2, there is disclosed a technique of adjusting the composition of steel sheets, making the grain boundary oxidation depth of hot-rolled steel sheets 5 μm or less, and performing Fe electro plating treatment on a cold-rolled steel sheet before galvannealing to make the grain boundary erosion depth of the galvannealed steel sheet 5 μm or less, and thereby suppressing the occurrence of cracking at the welding zone of the galvannealed steel sheets.

In addition, Patent Document 3 discloses a technique of removing plating of an abutted portion of a strip end portion for preventing liquid metal brittleness in a case where an electric resistance welded steel pipe is manufactured from a steel sheet plated with zinc or the like.

PRIOR ART DOCUMENT

Patent Document

[Patent Document 1] Japanese Unexamined Patent Application, First Publication No. 2006-265671

[Patent Document 2] Japanese Unexamined Patent Application, First Publication No. 2008-231493

[Patent Document 3] Japanese Unexamined Patent Application, First Publication No. H5-277532

DISCLOSURE OF THE INVENTION

Problems to be Solved by the Invention

In this manner, countermeasures for cracking at spot welding zones are being studied. However, a desired tensile strength still cannot be obtained in some spot welded joints of zinc-plated steel sheets or in some spot welded joints of non-plated steel sheet and zinc-plated steel sheets. The present inventors investigated the reasons thereof.

FIG. 2 is a schematic view showing a cross section including the nugget at a welding zone in the sheet thickness direction after the zinc-plated steel sheets are spot-welded. As shown in FIG. 2, in a spot welded joint in which a desired tensile strength cannot be obtained, cracking 6 occurred right, outside a corona bond at the overlapped faces of the steel sheets. In addition, cracking 7 occurred at a nugget boundary of a corona bond.

Then, in the positional relationship between the welding electrodes and the member to be welded immediately before spot welding, it was found that cracking easily occurs right outside the corona bond and at the nugget boundary of the corona bond occurring at the inner face sides of the steel sheets that are overlapped with each other in a case where welding is performed in a state in which disturbance factors are present as in the following states (a) to (d):

(a) a state in which an axial core of the welding electrode and a vertical line of a surface of the steel sheet that is brought into contact with the welding electrode are not parallel with each other;

(b) a state in which a distance from a front end section of one welding electrode to a surface of one steel sheet and a distance from a front end section of the other welding electrode to a surface of the other steel sheet are different from each other;

(c) a state in which an axial core of the other welding electrode is shifted from an extended line of an axial core of one welding electrode; and (d) a state in which a gap is provided between the overlapped faces at the welding zone.

In a case where the above-described disturbance factors are present, after pressure holding of the welding electrodes is ended (after the electrodes are released), a location where residual stress is high is formed right outside the corona bond and at the nugget boundary of the corona bond. Regarding this phenomenon, the present inventors thought that molten zinc plating intrudes into the grain boundaries of the steel sheets at the location and the grain boundary strength is decreased, thereby causing cracking right outside the corona bond or at the nugget boundary of the corona bond.

In the related art, immediately after electric current flow for welding between welding electrodes ends, steel sheets and the welding electrodes were brought out of contact. However, in a case where pressure holding of the welding electrodes was continued after the electric current flow for welding ends, and molten zinc plating was solidified before the electrodes were released, it was found that there is a case where cracking right outside a corona bond and at a nugget boundary of a corona bond does not occur. In addition, in a case where the squeeze time from when the welding electrodes are brought into contact with the steel sheets which are a member to be welded to when electric current flow for welding starts is set to a predetermined period of time or longer, even in a case where the above-described disturbance factors are present, it was found that there is a case where cracking right outside a corona bond and at a nugget boundary of a corona bond does not occur.

Further, the present inventors found that in a case where the pressure holding is continued, the joint strength tends to decrease. As a result of studying the pressure hold time that makes it possible to suppress cracking and not to decrease the joint strength, it was found that by using the pressure hold time of the adding electrodes and the squeeze time as a function of the total sheet thickness, cracking can be suppressed and sufficient joint strength can be obtained.

An object of the present invention is to provide a spot welding method capable of suppressing cracking occurring right outside a corona bond and at a nugget boundary of a corona bond on overlapped faces of the steel sheets and forming a high quality spot welded joint in spot welding of a sheet set including a zinc-plated steel sheet even in a case where various disturbance factors are present.

Means for Solving the Problem (1) A spot welding method according to an embodiment of the present invention is a spot welding method for a member to be welded constituted of a plurality of steel sheets that are overlapped at least at a welding zone, in which the member to be welded includes at least one steel sheet which is coated with zinc plating at at least an overlapped face at the welding zone, and a total sheet thickness t (mm) of the plurality of steel sheets is 1.35 mm or more, a squeeze time St (seconds) from when welding electrodes are brought into contact with the member to be welded to when electric current flow for welding to the welding electrodes starts satisfies Expression 1, and a hold time Ht (seconds) after welding from when electric current flow for welding between the welding electrodes ends to when the welding electrodes and the member to be welded are brought out of contact satisfies Expression 2.

$$0.020 \leq st \qquad \text{(Expression 1)}$$

$$0.015t^2 + 0.020 \leq Ht \qquad \text{(Expression 2)}$$

According to the spot welding method having the above configuration, it is possible to suppress cracking right outside a corona bond and at a nugget boundary of a corona bond and secure joint strength.

(2) According to the aspect of the present invention, in the spot welding method according to (1), the hold time Ht (seconds) after welding and the squeeze time St (seconds) may satisfy Expression 3, $$Ht + St \leq 0.20t^2 - 0.40t + 1.50 \qquad \text{(Expression 3)}$$

In the above aspect, it is possible to not only suppress cracking right outside a corona bond and at a nugget boundary of a corona bond but also obtain a desired joint strength while securing productivity.

(3) According to the aspect of the present invention, in the spot welding method according to (1) or (2), immediately before the welding electrodes are brought into contact with the member to be welded, one or two or more of the following conditions (a) to (d) may be satisfied:

(a) a state in which an axial core of the welding electrode and a perpendicular line of a surface of the steel sheet that is brought into contact with the welding electrode are not parallel with each other;

(b) a state in which a distance from a front end section of one welding electrode to a surface of one steel sheet and a distance from a front end section of the other welding electrode to a surface of the other steel sheet are different from each other;

(c) a state in which an axial core of the other welding electrode is shifted from an extended line of an axial core of one welding electrode; and (d) a state in which a gap is provided between the overlapped faces at the welding zone.

In a case where there is a disturbance factor defined by the above aspect, cracking right outside a corona bond and at a nugget boundary of a corona bond becomes remarkable but according to the spot welding method according to (1) or (2), it is possible to suppress such cracking and secure joint strength.

(4) According to the aspect of the present invention, in the spot welding method, according to any one of (1) to (3), at least one of the plurality of steel sheets may be a high strength steel sheet having a tensile strength of 780 MPa or more.

In the above aspect, it is possible to reduce the weight and increase the strength of the member to be welded by using a high strength steel sheet having a tensile strength of 780 MPa or more as the steel sheet.

(5) According to the aspect of the present invention, in the spot welding method according to any one of (1) to (4), before the electric current flow for welding starts, pre-energizing may be further performed and a start time of the electric current flow for welding may be an energization start time of the pre-energizing.

(6) According to the aspect of the present invention, in the spot welding method according to any one of (1) to (4), after the electric current flow for welding ends, post energizing may be further performed and an end time of the electric current flow for welding may be an energization end time of the post energizing.

(7) According to the aspect of the present invention, in the spot welding method according to any one of (1) to (4), before the electric current flow for welding starts, pre-energizing may be further performed and a start time of the electric current flow for welding may be an energization start time of the pre-energizing, and after the electric current flow for welding ends, post energizing may be further performed and an end time of the electric current flow for welding may be an energization end time of the post energizing.

In the aspect, it is possible to secure higher strength and toughness in a spot welded joint including a high strength steel sheet.

Effects of the Invention

According to the aspects of the present invention, it is possible to suppress cracking right outside a corona bond and at a nugget boundary of a corona bond and to secure high joint strength in spot welding of a sheet set including a zinc-plated steel sheet, even in a case where disturbance factors are present.

EMBODIMENTS OF THE INVENTION

Hereinafter, embodiments of the present invention will be described. However, it should be clearly understood that the present invention is not limited to these embodiments.

First Embodiment

The spot welding method according to an embodiment is a spot welding method for a member to be welded constituted of a plurality of steel sheets that are overlapped with each other at at least a welding zone. In the spot welding method, at least an overlapped face of at least one of the plurality of steel sheets at the welding zone is coated with zinc plating. In addition, in the spot welding method, a total sheet thickness t (mm) of the plurality of steel sheets is 1.35 mm or more.

In the spot welding method according to the embodiment, a squeeze time St (seconds) from when the welding electrodes are brought into contact with the member to be welded to when electric current flow for welding starts satisfies Expression 1, and a hold time Ht (seconds) after welding from when electric current flow for welding between the welding electrodes ends to when the welding electrodes and the member to be welded are brought out of contact satisfies Expression 2, $$0.020 \leq St \quad \text{(Expression 1)}$$

$$0.015t^2 + 0.020 \leq Ht \quad \text{(Expression 2)}$$

In the embodiments the squeeze time St means a time period from when the welding electrodes are brought into contact with the surface of the steel sheet, which is the member to be welded, to when electric current flow for welding starts. The time when welding electric current flow for welding starts means the time from when the overlapped faces of the steel sheets to be welded are brought into contact with each other at the welding zone and the welding pressure of the electrodes is increased.

In the spot welding method according to the embodiment, the squeeze time St is set to be in a range of 0.020 seconds or longer defined by Expression 1. This expression is an expression experimentally obtained, and as long as the squeeze time St is in the range defined by Expression 1, in a case where the axial core of the welding electrode is inclined to the surface of the steel sheet and in a case where there is a gap between the overlapped faces at the welding zone, the effect of reducing the influence of these disturbance factors is sufficiently obtained. As a result, the tensile stress when the welding electrodes are released after welding can be released and cracking right outside the corona bond or at the nugget boundary of the corona bond can be suppressed.

Figure 3:
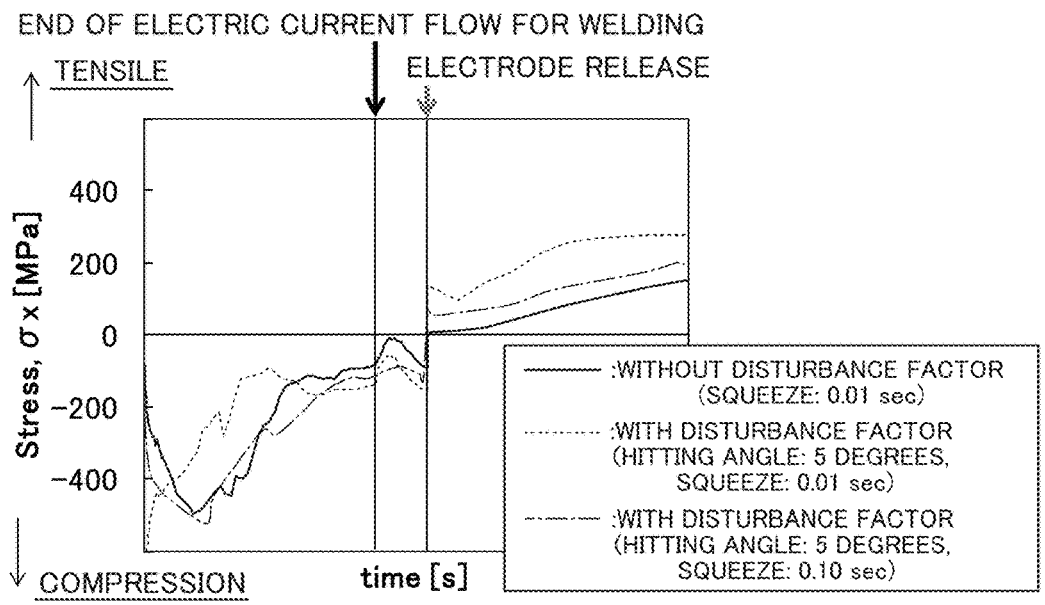
FIG. 3 is a graph showing a relationship among the hitting angle of a welding electrode, squeeze time, and a change in stress at the time of spot welding.

Here, test examples regarding a change in stress at the time of performing spot welding when the hitting angle of the welding electrode as the disturbance factor (the angle of the axial core of the welding electrode with respect to the perpendicular line of the surface of the steel sheet) is set to 5 degrees are shown in FIG. 3. In FIG. 3, in a state in which a disturbance factor is not present and in states in which a disturbance factor (a hitting angle of 5 degrees) is present and the squeeze time St is 0.01 seconds and 0.10 seconds, a change in stress before and after the welding electrodes are released after welding is shown.

As shown in FIG. 3, due to the presence of the disturbance factor, the tensile stress is generated at the time of releasing the electrodes. However, by setting the squeeze time St to be in the range defined by Expression 1, the tensile stress can be released.

Next, Expression 2 will be described. In the spot welding method according to the embodiment, as defined by Expression 2, the hold time Ht is defined as a function of a total sheet thickness t of the plurality of steel sheets.

Figure 4:
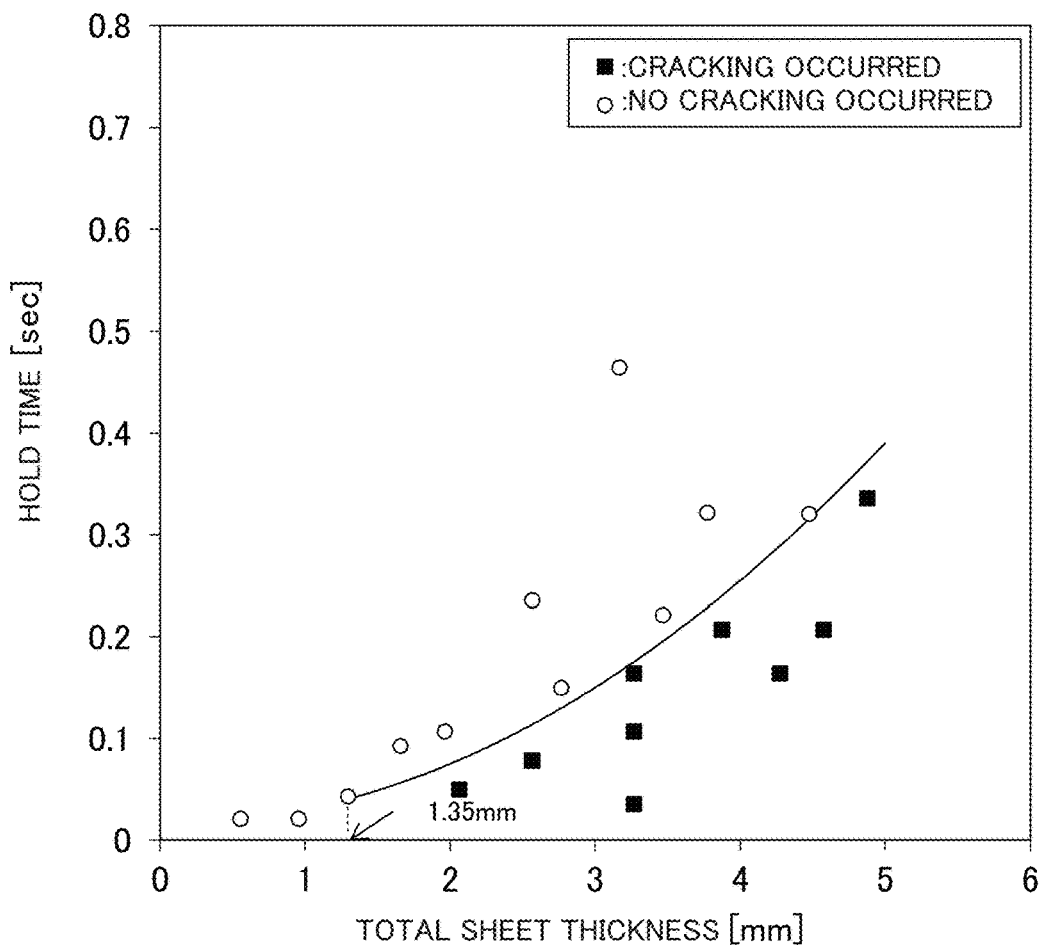
FIG. 4 is a graph showing a relationship between a total sheet thickness t and a hold time Ht after welding regarding the cracking right outside the corona bond or at the nugget boundary of the corona bond.

Expression 2 for defining the relationship between total sheet thickness f and the hold time Ht after welding is an experimentally obtained expression. FIG. 4 shows a relationship between the total sheet thickness t and the hold time Ht after welding regarding cracking right outside the corona bond or at the nugget boundary of the corona bond. FIG. 4 is a graph formed from test result examples and various sheet sets described later. In addition, in a member to be welded having a total sheet thickness of less than 1.35 mm, the rate of occurrence of cracking right outside the corona bond or at the nugget boundary of the corona bond is low, and thus Expression 1 is applied to a case in which the total sheet thickness is 1.35 mm or more.

Although the details are described in examples, the results shown in FIG. 4 are obtained from tests in which in a case where spot welding is performed using two sheets of various kinds of zinc-plated steel sheets, the total sheet thickness t of the steel sheets and the hold time Ht after welding from when electric current flow for welding between the welding electrodes ends to when the welding electrodes and the member to be welded are brought out of contact are variously changed. Then, whether or not cracking right outside the corona bond or at the nugget boundary of the corona bond occurs is confirmed with respect to obtained welded joints. The cracking right outside the corona bond or at the nugget boundary of the corona bond is confirmed by observing the cross section including the nugget in the sheet thickness direction.

As shown, in FIG. 4, at the total sheet thicknesses t and the hold time after weldings Ht shown by circle marks, cracking right outside the corona bond or at the nugget boundary of the corona bond does not occur in the welded joints. In contrast, at the total sheet thicknesses t and the hold time after weldings Ht shown by square marks, cracking right outside the corona bond or at the nugget boundary of the corona bond is observed. As a result, it is found that the boundary at which cracking right outside the corona bond or at the nugget boundary of the corona bond (the boundary between the circle marks and the square marks) occurs can be defined by Expression 1.

The reason for eliminating cracking right outside the corona bond or at the nugget boundary of the corona bond by setting the hold time Ht after welding with respect to the total sheet thickness t to be in the range defined by Expression 1 is considered to be as follows.

First, places where welding residual stress is increased right outside the corona bond and at the nugget boundary of the corona bond are in a compressed state in a process of squeezing the location by the welding electrodes at the time of spot welding, but the state of the location becomes a pulled state as the welding electrodes are separated from the surface of the steel sheet, thereby generating tensile stress. This is also understood from FIG. 3 described above. The cracking right outside the corona bond and at the nugget boundary of the corona bond is caused by a reduction in grain boundary strength which occurs in a case where a zinc plating metal molten right outside the corona bond intrudes into the grain boundaries of the steel sheet in the places where welding residual stress is high right outside the corona bond and at the nugget boundary of the corona bond after welding.

Since the locations where welding residual stress is increased are formed after the welding electrodes are separated from the surface of the steel sheet (after the electrodes are released), pressure holding of the welding electrodes is continued after electric current flow for welding ends (the hold time Ht after welding is extended) and before the electrodes are released, molten zinc plating is solidified. Thus, the molten zinc plating does not intrude into the grain boundaries of the steel sheet in the places where welding residual stress is high and thus cracking can be suppressed. Since the solidification of the zinc plating is related to ease of cooling of the steel sheet, that is, total sheet thickness t of the member to be welded, the hold time Ht after welding of the welding electrode is adjusted to a function of the total sheet thickness t, and thus cracking right outside the corona bond or at the nugget boundary of the corona bond can be suppressed.

According to the spot welding method according to the embodiment, it is possible to secure joint strength by suppressing cracking right outside the corona bond and at the nagger boundary of the corona bond.

Second Embodiment

Next, another embodiment according to the present invention will be described. The spot welding method according to the embodiment is basically the same as the spot welding method according to the first embodiment.

The spot welding method according to the embodiment is a spot welding method for a member to be welded constituted of a plurality of steel sheets overlapped at at least a welding zone, in which at least an overlapped face of at least one of the plurality of steel sheets at the welding zone is coated with zinc plating, a total sheet thickness t (mm) of the plurality of steel, sheets is 1.35 mm or more, a squeeze time St (seconds) from when welding electrodes are brought into contact with the member to be welded to when electric current flow for welding between the welding electrodes starts satisfies Expression 1, a hold time Ht (seconds) after welding from when the electric current flow for welding between the welding electrodes ends to when the welding electrodes and the member to be welded are brought out of contact satisfies Expression 2, and the hold time Ht (seconds) after welding arid the squeeze time St (seconds) further satisfy Expression 3.

$$0.020 \leq St \quad \text{(Expression 1)}$$

$$0.015t^2 + 0.020 \leq Ht \quad \text{(Expression 2)}$$

$$Ht + St \leq 0.20t^2 - 0.40t + 1.50 \quad \text{(Expression 3)}$$

In the spot welding method according to the embodiment, the sum of the hold time Ht and the squeeze time St is defined as a function of the total sheet thickness t of the plurality of steel sheets as defined by Expression 3.

Figure 5:
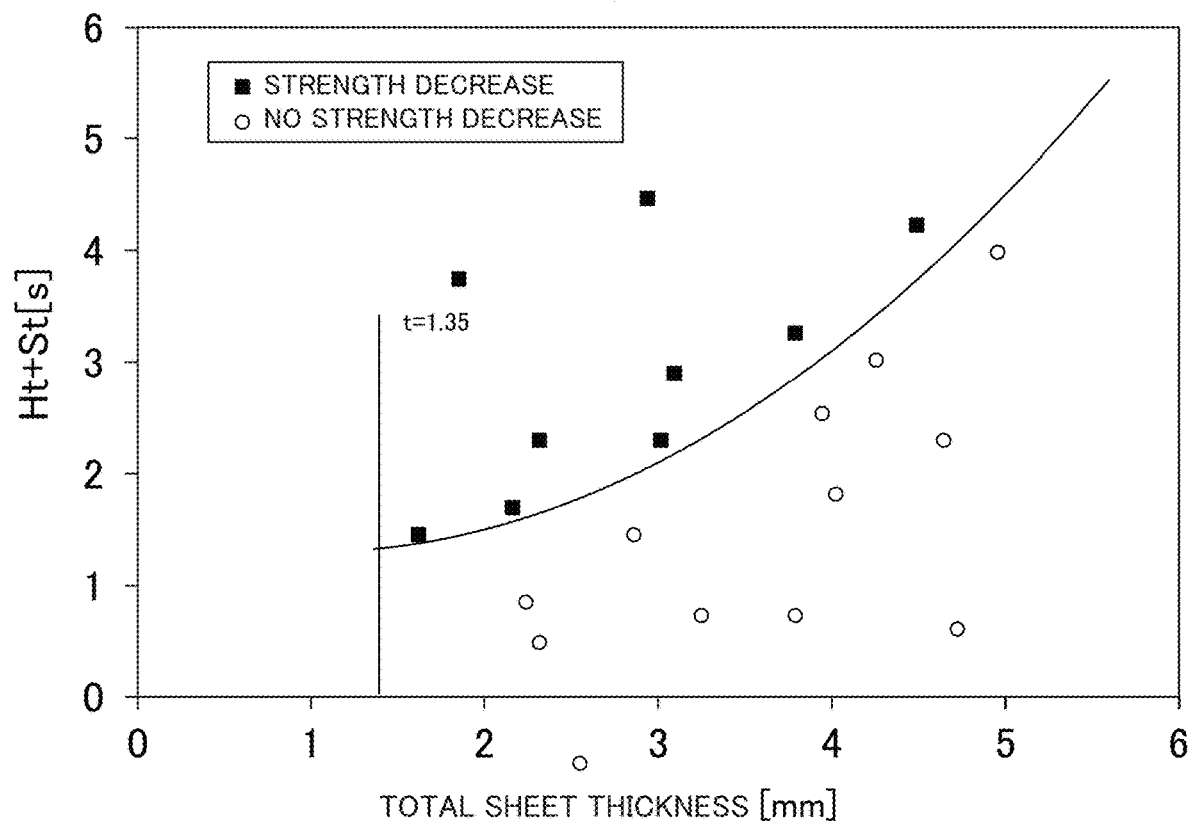
FIG. 5 is a graph showing a relationship of the sum of the hold time Ht after welding and the squeeze time St with respect to the total sheet thickness t regarding cross tensile strength (CTS).

Expression 3 for defining the hold time Ht after welding and the squeeze time St is an experimentally obtained expression. FIG. 5 shows a relationship of the sum of the hold time Ht after welding and the squeeze time St with respect to the total sheet thickness t in the joint strength of the member to be welded after welding. FIG. 5 is formed from the test results of examples and various sheet sets described later, and various conditions are the same as in the first embodiment. FIG. 5 shows the results in which cross tensile strength (CTS) measured by applying a tensile load to each of the obtained welded joints in a peeling direction is confirmed. The cross tensile strength (CTS) is confirmed by a method defined in JIS Z3137.

At the sum of the hold time Ht after welding and the squeeze time St with respect to the total sheet thickness t shown by a square mark in FIG. 5, cracking right outside the corona bond or at the nugget boundary of the corona bond does not occur in the welded joint, but CTS Is relatively significantly reduced. As a result, it is found that at: the boundary at which sufficient CTS is obtained (the boundary between the square marks and the circle marks) can be defined by Expression 3.

As described above, experimentally, it is found that in a case where the sum of the hold time Ht after welding and the squeeze time St with respect to the total sheet thickness t satisfies Expression 3, CTS is reduced less. The reason for obtaining sufficient CTS by setting the sum of the hold time Ht after welding and the squeeze time St with respect to the total sheet thickness t to be in a range defined by Expression 3 is considered, to be as follows.

In a case where the squeeze rime St is long, the effect of suppressing the disturbance factor is increased. In this case, since the cooling rate in the welded portion is excessively increased by reducing the hold time Ht and the hardness of the nugget and the heat affected zone is not increased, the cross tensile strength is not reduced. On the other hand, in a case where the squeeze time St is short, productivity is improved and sufficient toughness is obtained by extending the hold time Ht. Thus, sufficient joint strength can be obtained.

That is, according to the spot welding method including the above configurations, cracking right outside the corona bond and at the nugget boundary of the corona bond can be suppressed and also a desired joint strength can be obtained while ensuring productivity.

In the spot welding methods according to the first or second embodiment, immediately before the welding electrodes are brought into contact with the member to be welded, among the conditions of the following disturbance factors (a) to (d), even in a case where 1 or 2 or more conditions are satisfied, cracking right outside the corona bond and at the nugget boundary of the corona bond is suppressed and joint strength can be secured.

Figure 6:
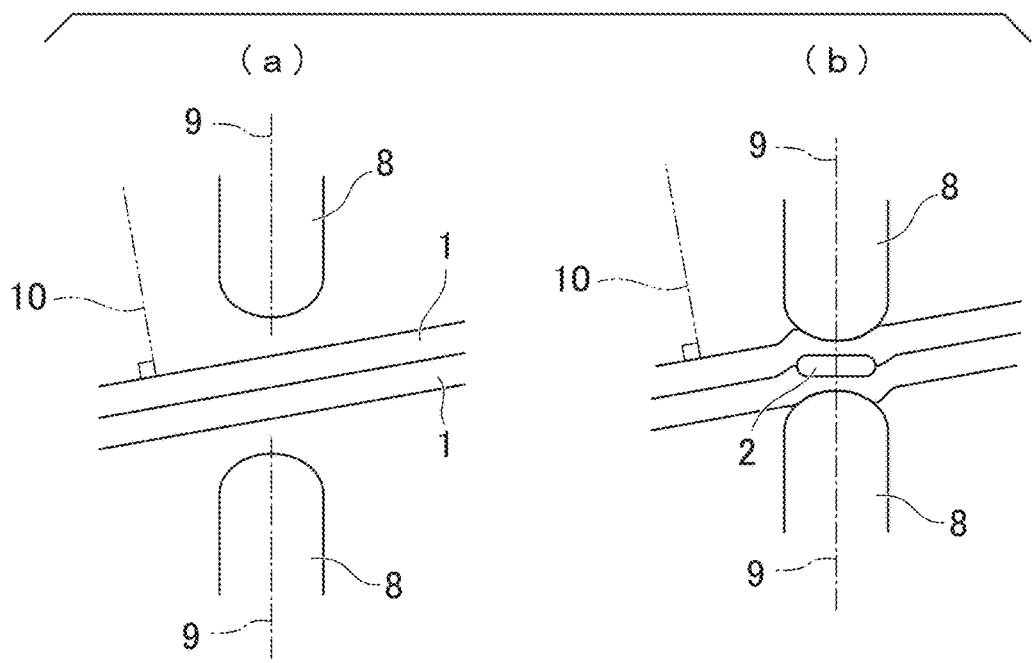
FIG. 6 is a schematic view showing a state in which an axial core of a welding electrode and a perpendicular line of a surface of the steel sheet that is brought into contact with the welding electrode are not parallel with each other.

Disturbance Factor (a): A State in which the Axial Core of the Welding Electrode and the Perpendicular Line of the Surface of the Steel Sheet that is Brought into Contact with the Welding Electrode Are Not Parallel with Each Other In spot welding, basically, the welding electrode is perpendicularly brought into contact with the surface of the steel sheet. However, the member to be welded has a plurality of welding zones and welding at various welding postures is required in some cases. In this case, due to a teaching error of a spot welding machine, restriction of operation time and the like, the time for correcting a welding posture cannot be secured and in a state in which the axial core of the welding electrode is inclined to the surface of the steel sheet that is brought into contact with the welding electrode from a perpendicular line, spot welding is performed in some cases. (a) of FIG. 6 shows a schematic view of a state in which an axial core 9 of a welding electrode 8 and a perpendicular line 10 of a surface of the steel sheet 1 with which the welding electrode 8 is brought into contact are not parallel with each other.

As described above, in a case where welding Is performed in a state in which an angle formed between the axial core 9 of the welding electrode 8 and the surface of the steel sheet 1 with which the welding electrode 8 is brought into contact is deviated from the perpendicular line, the axial core 9 of the welding electrode 8 has an angle, called a hitting angle, with respect to the perpendicular line 10 of the surface of the steel sheet 1 with which the welding electrode 8 is brought into contact. In a case where the welding electrode 8 is brought into contact with the surface of the steel sheet 1 in a state in which the hitting angle is greater than 0 degrees (a state in which the axial core 9 of the welding electrode 8 is not perpendicular to the surface of the steel sheet 1), the steel sheet 1 is deformed as shown in (b) of FIG. 6. Due to such deformation, a location where stress is relatively high is formed in the vicinity of the corona bond, and thus cracking easily occurs in this place.

In a case where the hitting angle is 3 degrees or more, particularly, cracking right outside the corona bond and at the nugget boundary of the corona bond easily occurs. However, in the spot welding method according to the first or second embodiment, the effect of suppressing cracking is obtained. In addition, in a case where the hitting: angle is 5 degrees or more, cracking right outside the corona bond and at the nugget boundary of the corona bond more easily occurs, and thus joint strength tends to be significantly reduced. However, in the spot welding method according to the first or second embodiment, it is possible to suppress such quality deterioration.

Disturbance Factor (b): a State in which a Distance from the Front End Section of one Welding Electrode to the Surface of one Steel Sheet and a Distance from the Front End Section of the Other Welding Electrode to the Surface of the Other Steel Sheet Are Different from Each Other During the spot welding, an equalizing mechanism for keeping the central position of the sheets held between the welding electrodes for sandwiching the sheets between the welding electrodes is provided. In a case where an equalizing mechanism is provided, a spot welding gun is enlarged by the size of the equalizing mechanism, a welding robot has to be enlarged according to the size increase, and as a result, the cost of the welding robot is increased. Therefore, there is a case of performing welding without providing an equalizing mechanism in the spot welding gun.

Figure 7:
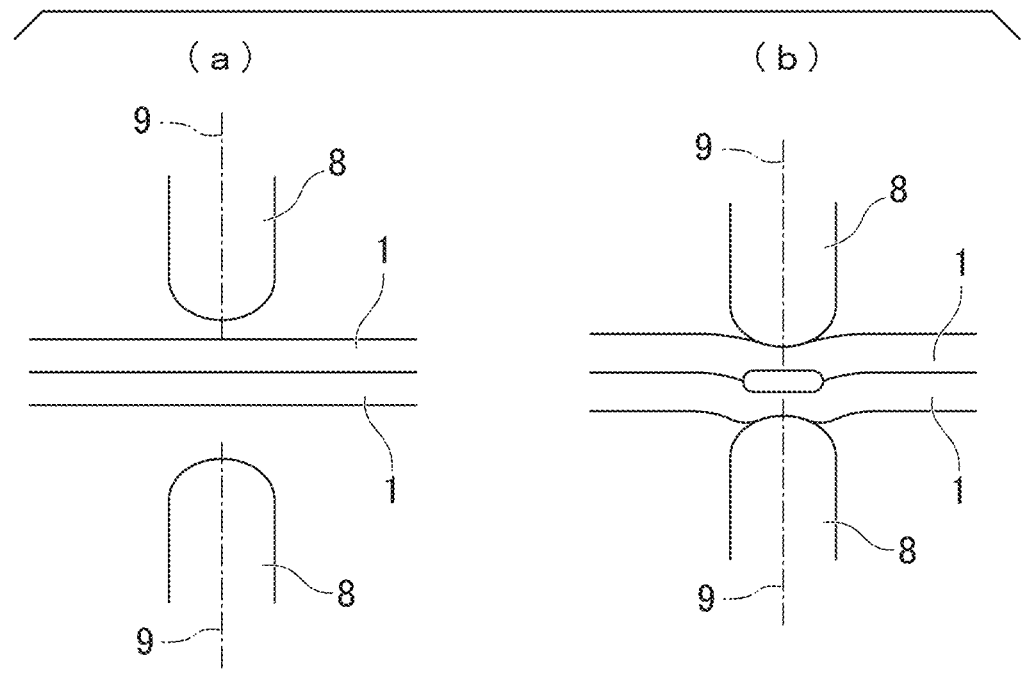
FIG. 7 is a schematic view showing a state in which respective distances from each front end section of facing welding electrodes to the surface of each steel sheet are different.
Figure 8:
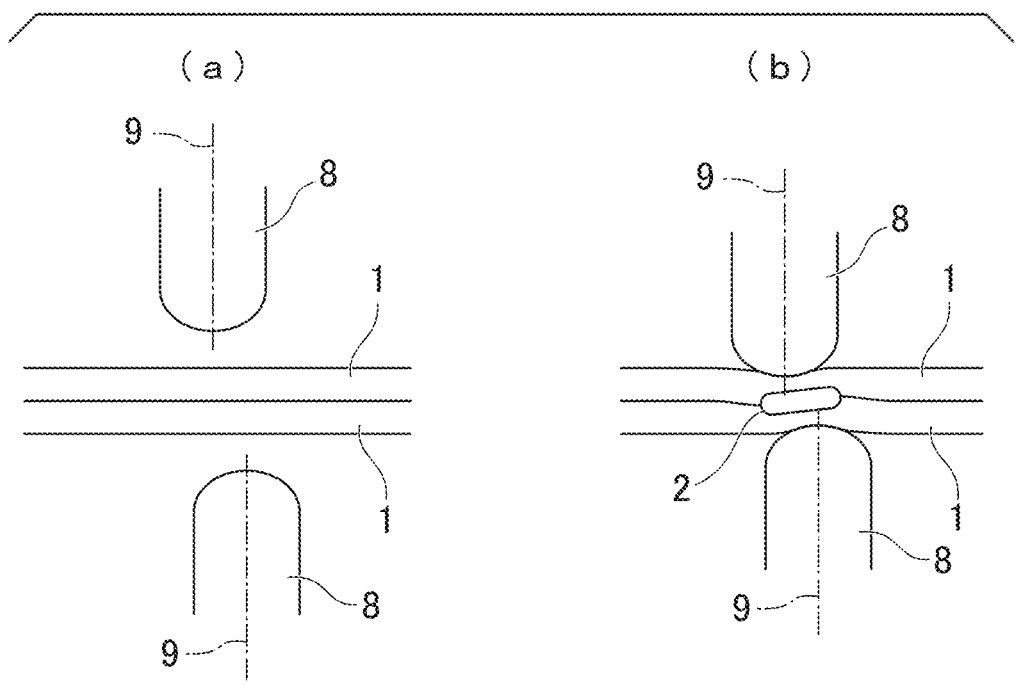
FIG. 8 is a schematic view showing a state in which the axial core of the other welding electrode is shifted from the extended line of the axial core of one welding electrode.

In this case, as shown in (a) of FIG. 7, immediately before the welding electrodes 8 are brought into contact with the member to be welded (steel sheets 1), a distance from the front end section of one welding electrode 8 to the surface of the steel sheet 1 closest to the front end section is different from a distance from the front end section of the other welding electrode 8 to the surface of the steel sheet 1 closest to the front end section. In a case where the welding electrodes 8 are brought into contact with the steel sheets and pressed in this state, as shown in (b) of FIG. 7, one steel sheet 1 (in a case of FIG. 7, upper steel sheet 1) is deformed to the other steel sheet 1 at the welding zone. In a case of performing welding in a state of such deformation, local stress is generated in the vicinity of the corona bond. Thus, cracking easily occurs in this place.

As described above, in a case of performing welding without providing an equalizing mechanism in the spot welding gun and in a case where the distances between the welding electrodes and the surfaces of the steel sheets cannot be set to be appropriate due to the configuration of the member to be welded, in the axial core direction of the welding electrode, misalignment of the spot welding gun and the member to be welded is not absorbed and cracking right outside the corona bond and at the nugget boundary of the corona bond easily occurs. Even in such a case, in the spot welding method according to the first or second embodiment, the effect of suppressing cracking right outside the corona bond and at the nugget boundary of the corona bond is obtained.

Disturbance Factor (c): A State in which the Axial Core of the Other Welding Electrode is Shifted from the Extended Line of the Axial Core of one Welding Electrode In a case where a large number of spots are welded, due to buckling of the welding electrode axis and abrasion of a movable part of the spot welding gun, as shown in (a) of FIG. 6, the axial core 9 of the other welding electrode 8 is shifted from the extended line of the axial core 9 of one welding electrode 8 and the misalignment of the electrode cores occurs. In a case where welding is performed in a state in which the misalignment of the electrode cores occurs, the deformation shown in (b) of FIG. 6 is applied and stress is generated in the vicinity of the corona bond in some cases.

In a case where the misalignment of the electrode cores of the welding electrodes is 0.5 mm or more, particularly, cracking right outside the corona bond and at the nugget boundary of the corona bond easily occurs. However, in the spot welding method according to the first or second embodiment, the effect of suppressing cracking is obtained. In addition, in a case where the misalignment of the electrode cores of the welding electrodes is 1 mm or more and a larger amount of stress is generated, the effect of suppressing cracking by using the spot welding method according to the first or second embodiment is obtained.

Figure 9:
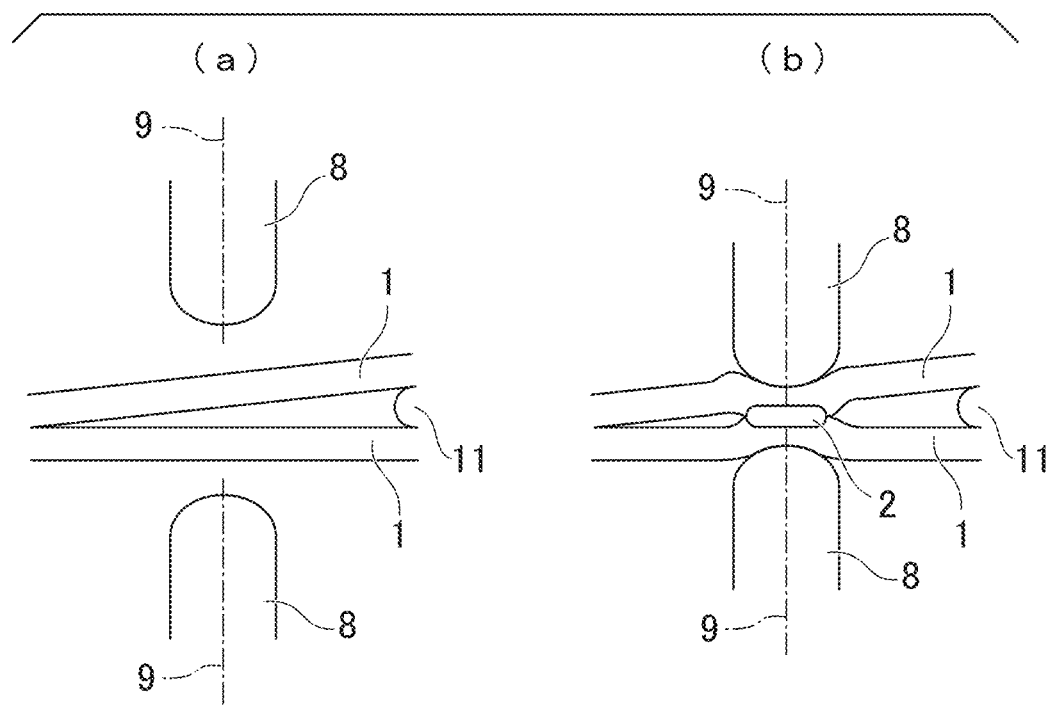
FIG. 9 is a schematic view showing a state in which a gap is provided between the overlapped faces at the welding zone.

Disturbance Factor (d): A State in which a Gap is Provided Between the Overlapped Faces at the Welding Zone As shown in (a) of FIG. 9, in a case where another member 11 is inserted between the steel sheets 1 and the like, spot welding is performed in a state in which a gap is provided between the overlapped faces of the steel sheets 1 at the welding zone (hereinafter, also referred to as "sheet gap") in some cases. In a case where the welding electrodes 8 are brought into contact with the steel sheets and pressed in such a state in which there is a sheet gap, as shown in (b) of FIG. 9, local deformation in the steel sheets 1 is observed at the welding zone. In a case of performing welding in a deformed state as described above, local stress is generated in the vicinity of the corona bond. Thus, cracking easily occurs in this place.

In a case where the sheet gap at the spot position of the welding electrodes in the axial core direction is 0.2 ram or more in the member to be welded, particularly, cracking right outside the corona bond and at the nugget boundary of the corona bond easily occurs. Even in this case, in the spot welding method according to the first or second embodiment, the effect of suppressing cracking is obtained. In addition, in a case where the sheet gap is 1 mm or more and is further 2 mm or more and a larger amount of stress is generated, the effect of suppressing cracking by using the spot welding method according to the first or second embodiment is obtained.

Next, conditions required for the spot welding method according to the embodiment and preferable conditions thereof will be further successively described. First the member to be welded will be described.

(Member to be Welded)

In the spot welding method according to the embodiment as the member to be welded, a member constituted of a plurality of steel sheets which are overlapped with each other at a welding zone, at least one of the steel sheets being a steel sheet coated with zinc plating is preferably prepared. For example, two or more steel sheets coated with zinc plating having a tensile strength of 780 MPa or more, a Ceq of 0.15% by mass or more, and having a sheet thickness of 0.5 to 3.0 mm may be prepared.

In a case where spot welding is performed on the member to be welded, two steel sheets are overlapped, and while pressing electrodes formed of a copper alloy or the like against the two steel sheets from both sides so as to sandwich two steel sheets therebetween, electric current flow for welding starts to form a molten metal. After the electric current flow for welding ends, heat is removed by the water-cooled electrodes and the heat is conducted to the steel sheets themselves whereby the molten metal is rapidly cooled and made to solidify and a cross-sectional elliptical shaped nugget is formed between the steel sheets.

For example, for the spot welding conditions, the electrodes may be made into dome radius types with a front end diameter of 6 to 8 mm, the welding pressure may be set to 1.5 to 6.0 kN, the energization time may be set to 5 to 50 cycles (power supply frequency 50 Hz), and the electric current for welding may be set to 4 to 15 kA.

The member to be welded which is to be spot-welded is not particularly limited as long as the member to be welded is constituted of at least a plurality of steel sheets that are overlapped at the welding zone and the overlapped face of at least one of the plurality of steel sheets is coated with zinc plating. For example, a plurality of steel sheets to be spot-welded, all of which have overlapped faces that are coated with zinc plating, and a plurality of steel sheets including a steel sheet to be spot-welded which has an overlapped face that is coated with zinc plating and a steel sheet to be spot-welded which is not coated with zinc plating may be used.

In addition, in the steel sheet to be spot-welded which has an overlapped face that is coated with zinc plating, a surface opposite to the overlapped face of the steel sheet to be spot-welded, that is, a contact surface with the welding electrode may be coated with zinc plating or may not be coated with zinc plating. However, considering the corrosion resistance of the spot welded joint, the contact surface with the welding electrode is preferably coated with zinc plating.

As the plurality of steel sheets to be spot-welded, in FIGS. 6 to 9, two steel sheets are shown as an example, but depending on the form of structural components to be joined, a plurality of three or more steel sheets can be used. The sheet thicknesses of the respective steel sheets which are spot welded are not particularly limited and may be 0.5 to 3.0 mm. In addition, the total sheet thickness t of the plurality of steel sheets is 1.35 mm or more and the upper limit is not particularly limited. The total sheet thickness t may be 7.0 mm or less.

The lower limit of the total sheet thickness t is more preferably 2.4 mm or more and even more preferably 2.7 mm or more. The upper limit of the total sheet thickness t is more preferably 4.0 mm or less and even more preferably 3.2 mm or less. By setting the total sheet thickness t to be in this range, cracking right outside the corona bond and at the nugget boundary of the corona bond is suppressed, the joint strength is secured, and further, a reduction in weight and an increase in strength of the member to be welded are promoted.

In addition, the steel sheets may have sheet-shaped portions at least at apart and the sheet-shaped portions may be mutually superposed. The steel sheets may not be sheets as a whole. In addition, the plurality of steel sheets is not limited to ones constituted of separate steel sheets and may also be formed by a single steel sheet formed into a tubular shape or other predetermined shapes and then overlapped with each other.

Further, the steel sheets of the member to be welded to be spot-welded are not particularly limited to the composition, the metallographic structure, and the like. However, for steel sheets of which the overlapped face to be welded is coated with zinc plating or for steel sheets overlapped with steel sheets coated with zinc plating through zinc plating, the above cracking easily occurs particularly in a TRIP steel sheet or the like. However, in high strength steel sheets other than above-mentioned steel sheets, in a case of using a high strength steel sheet having a Ceq of 0.15% by mass or more or the like, cracking right outside the corona bond and at the nugget boundary of the corona bond easily occurs, and thus the welding method of the present invention may be particularly effective for such steel sheets.

Ceq is defined as Expression 4.

$$Ceq=[C]+[Si]/30+[Mn]/20+2[P]+4[S] \quad \text{(Expression 4)}$$

Herein, [C], [Si], [Mn], [P], and [S] represent amounts (% by mass) of C, Si, P, and S.

From the viewpoint of reducing weight and increasing strength, Ceq is preferably 0.18% by mass or more and Ceq is more preferably 0.20% by mass or more.

In addition, the zinc plating covering the steel sheets to be welded is not particularly limited as long as the plating contains zinc. For example, as the type of plating, hot dip galvanized plating, galvannealed plating, electrogalvanized plating, and zinc-nickel electroplating may be exemplified. Further, it is possible to include plating of a zinc-aluminum-magnesium system.

(Pre-Energizing and Post Energizing)

In the spot welding method according to the first or second embodiment, pre-energizing may be further performed before the electric current flow for welding starts. In the pre-energizing, before the electric current flow for welding starts, two steel sheets which are the members to be welded are overlapped with each other and pressure is applied with the welding electrodes from both sides so as to sandwich the two steel sheets between the steel sheets. The electric current value is set to a pre-energizing current $I_f$ (kA) and pre-energizing in which a state in which the electric current value is the pre-energizing current $I_f$ (kA) is held for a pre-energizing time $t_f$ (msec) is performed. The pre-energizing current $I_f$ (kA) and the pre-energizing time $t_f$ (msec) are not particularly limited and in order to suppress the occurrence of splash, for example, the pre-energizing current $I_f$ (kA) is 0.4 times or more an electric current for welding $I_w$ (kA) and less than the electric current for welding $I_w$ (kA), and the pre-energizing time $t_f$ (msec) is 20 msec or longer.

In a case where the pre-energizing time $t_f$ (msec) has passed, while holding pressing of the welding electrodes, the electric current value is set to 0 (zero) and a state in which the electric current value is 0 (zero) is held for a cooling time after pre-energizing $t_C$ (msec). The cooling time after pre-energizing $t_C$ (msec) is, for example, 0 msec or longer and 250 msec or shorter. At the time of start of the pre-energizing, the electric current value is not immediately set to the pre-energizing current $I_f$ (kA) and the electric current value may be gradually increased (increased in an upslope pattern) from 0 (zero) until the electric current value reaches the pre-energizing current $I_f$ (kA). After cooling, while holding pressing of the welding electrodes, welding may be performed by setting the electric current value to the electric current for welding $I_W$ (kA).

In a case of performing pre-energizing, the start time of the electric current flow for welding is an energization start time of the pre-energizing.

In the spot welding method according to the first or second embodiment, after the electric current flow for welding ends, post energizing may be further performed. In the post energizing, after the electric current flow for welding ends, while pressing of the welding electrodes is held, the electric current value is set to 0 (zero). A state in which the electric current value is 0 (zero) is held for the cooling time (solidification time $t_S$ (msec) after electric current flow for welding ends and the molten metal is solidified from an outer periphery to form a shell-shaped solidified region having an unsolidified region remaining inside thereof. The cooling time is not particularly limited and is, for example, 1 to 300 msec in order to improve the toughness of the heat affected zone by the post energizing described later. In a case where the cooling time $t_S$ (msec) after electric current flow for welding ends has passed, while pressing of the welding electrodes is held, when an unsolidified region remains, the electric current value is set to a post energizing current $I_p$ (kA), and a state in which the electric current value is the post energizing current $I_p$ (kA) is held for a post energizing time $t_p$ (msec) for performing post energizing. The post energizing current $I_p$ (kA) and the post energizing time $t_p$ (msec) are not particularly limited and in order to reduce precipitation of P, S, and the like having a significant influence on the toughness of the heat affected zone, for example, the post energizing current $I_p$ (kA) is 0.6 times or more the electric current for welding $I_W$ (kA) and equal to or less than the electric current for welding $I_W$ (kA), and the post energizing time $t_p$ (msec) is 1 to 500 msec.

In order to improve the continuous spotting properties of the spot welding, the cooling and post energizing in which the electric current value is set to 0 (zero) may be set as one process and this process may be repeated twice or more. In a case where this process is repeated twice or more, it is preferable to set the cooling time $t_S$, the post energizing current $I_p$, and the post energizing time $t_p$ in the first process and these conditions in the subsequent process to be the same from the viewpoint of working efficiency. In addition, the total of each post energizing time $t_p$ in the post energizing is preferably 80 to 2,000 msec.

In a case of performing post energizing, the end time of electric current flow for welding is an energization end time of the post energizing. In the spot welding method according to the first or second embodiment, both pre-energizing and post energizing may be performed.

(Spot Welding Performed in Advance)

Spot welding for bringing the welding electrodes and the member to be welded out of contact is performed on the member to be welded in advance immediately after electric current flow for welding between the welding electrodes ends, and cracking right outside the corona bond and at the nugget boundary of the corona bond is confirmed. In a case where cracking occurs, in welding for the welding zone below, welding may be performed by the spot welding method according to the first or second embodiment.

In the spot welding which is performed on the member to be welded in advance, immediately after the electric current flow for welding between the welding electrode ends, the welding electrodes and the member to be welded are brought out of contact, without extending the hold time Ht after welding, as in the above-described spot welding, two steel sheets are overlapped, and while the electrodes are pressed from both sides so as to sandwich the two steel sheets, energization is performed to form a cross-sectional elliptical shaped nugget. For the spot welding conditions at this time, the same conditions as described above can be adopted.

Figure 1:
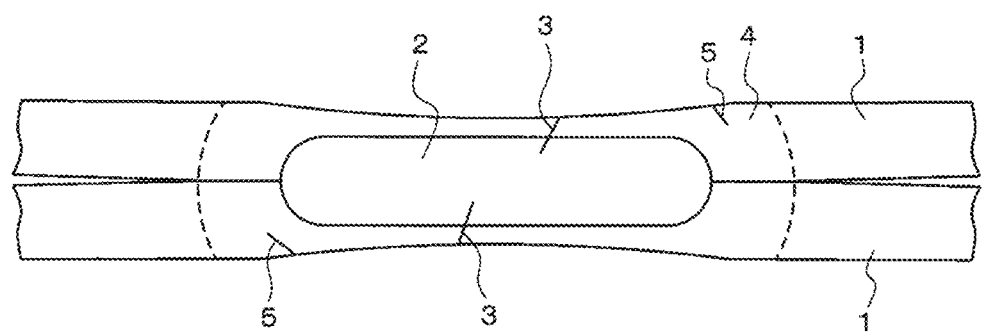
FIG. 1 is a view schematically showing cracking in a cross section of a welding zone of spot-welded zinc-plated steel sheets in a sheet thickness direction.
Figure 2:
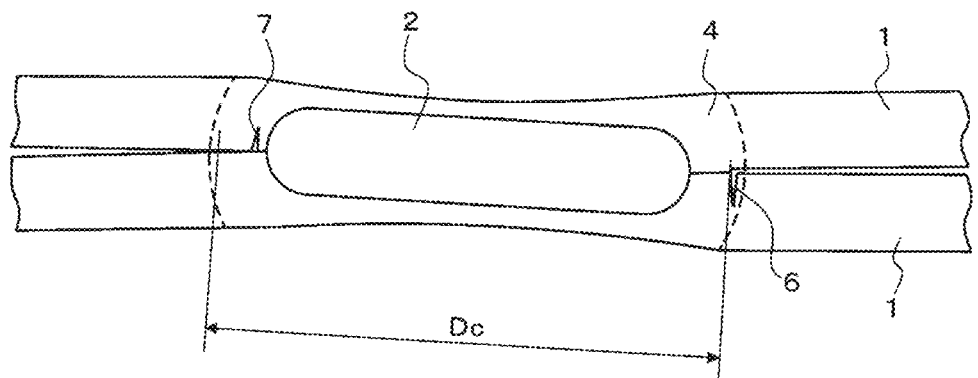
FIG. 2 is a schematic view showing cracking right outside a corona bond or at a nugget boundary of a corona bond at the welding zone of the spot-welded zinc-plated steel sheets in the sheet thickness direction.

Then, the occurrence of cracking right outside the corona bond and cracking at the nugget boundary of the corona bond at the overlapped faces is confirmed. The confirmation of the cracking is performed by, for example, cutting the steel sheets in the sheet thickness direction so as to include the nugget and confirming the cross section. As shown in FIG. 2, in a case where cracking is confirmed at at least one of right outside the corona bond and at the nugget boundary of the corona bond at the overlapped faces, spot welding may be performed again so as to satisfy the conditions defined in the first or second embodiment.

In a case where the occurrence of cracking right outside the corona bond and cracking at the nugget boundary of the corona bond at the spot welded joint is confirmed, the method of confirming the occurrence of cracking is not particularly limited. A method of observing the cross section including the nugget in the sheet thickness direction, and a method of determining whether or not a predetermined tensile strength is obtained by performing a tensile test for the spot welded joint can be used. Since there is a case where cracking right outside the corona bond and at the nugget boundary of the corona bond may not be observed depending on the cutting position of the cross section including the spot welded portion in the sheet thickness direction, an X-ray transmission test may be performed to confirm cracking.

Cracking right outside the corona bond and at the nugget boundary of the corona bond occurs at the overlapped faces of the steel sheets coated with zinc plating or at the faces of the steel sheets overlapped with steel sheets coated with zinc plating through zinc plating. Further, cracking occurs inside the corona bond and its vicinity at these faces of the steel sheets. The "inside the corona bond and its vicinity" is from the nugget side end portion of the corona bond to a range about 1.2 times a corona bond diameter Dc at these faces of the steel sheets.

EXAMPLES

Next, examples of the present invention will be described. However, the conditions in the examples are illustrations of conditions employed for confirming the workability and effects of the present invention, and the present invention is not limited to these illustrations of conditions. The present invention may employ various conditions so long as not deviating from the gist of the present invention and achieving the object of the present invention.

Example 1

Table 1 shows the steel sheets A to I used in the tests. All of the steel sheets A to F, H, and I shown in Table 1 are galvannealed steel sheets, and both faces are galvanized. The coated layer of galvannealing that is performed on each of the steel sheets A to F, H, and I was formed through process of dipping the steel sheet in a galvanizing bath after annealing and then performing alloying, a process of dipping the steel sheet in a galvanizing bath and then performing hot stamping, or a process of dipping the steel sheet in a galvanizing bath.

TABLE 1

| Steel sheet | Kind of steel | Strength class | Sheet thickness [mm] | Amount of C [mass %] | Ceq | Plating |
|---|---|---|---|---|---|---|
| A | Hot stamped | 1470 MPa | 2.0 | 0.210 | 0.34 | Zinc |
| B | Hot stamped | 1470 MPa | 1.6 | 0.190 | 0.35 | Zinc |
| C | Cold rolled | 1180 MPa | 1.2 | 0.220 | 0.44 | Zinc |
| D | Cold rolled | 980 MPa | 1.4 | 0.240 | 0.43 | Zinc |
| E | Cold rolled | 590 MPa | 1.2 | 0.090 | 0.18 | Zinc |
| F | Cold rolled | 2000 MPa | 1.4 | 0.420 | 0.54 | Zinc |
| G | Cold rolled | 1180 MPa | 1.6 | 0.210 | 0.39 | None |
| H | Cold rolled | 270 MPa | 0.7 | 0.003 | 0.08 | Zinc |
| I | Cold rolled | 1470 MPa | 1.4 | 0.390 | 0.56 | Zinc |

Ceq = [C] + [Si]/30 + [Mn]/20 + 2[P] + 4[S]
[C], [Si], [Mn], [P], and[S] represent amounts (% by mass) of C, Si, P, and S With respect to combinations of the steel sheets as shown in Table 2, spot welding is performed using a servo gun type welding machine under various welding conditions and disturbance factors shown in Table 2. In addition, in every spot welding, a copper electrode of a dome radius type with a front end radius of 40 (mm) having a front end diameter of 8 (mm) was used for welding. During pressing, the welding pressure was not changed.

TABLE 2

| | Steel sheet combination | | | Total sheet thickness t [mm] | Welding pressure [N] | Energization condition | | | | | |
|---|---|---|---|---|---|---|---|---|---|---|---|
| No. | First sheet | Second sheet | Third sheet | | | Electric current [kA] | Energization time [sec] | Hold time Ht [sec] | Squeeze time St [sec] | Ht + St [sec] | Disturbance factor |
| 1 | A | A | — | 4.0 | 3000 | 7.8 | 0.40 | 0.26 | 0.02 | 0.28 | Hitting angle 5° |
| 2 | B | B | — | 3.2 | 3500 | 6.9 | 0.35 | 0.18 | 0.03 | 0.21 | Hitting angle 5° |
| 3 | B | B | — | 3.2 | 3500 | 7.8 | 0.35 | 1.02 | 0.08 | 1.10 | Hitting angle 5° |
| 4 | C | C | — | 2.4 | 4000 | 6.5 | 0.25 | 0.25 | 0.02 | 0.27 | Hitting angle 5° |
| 5 | C | C | — | 2.4 | 4000 | 8.3 | 0.25 | 0.15 | 0.02 | 0.17 | Hitting angle 5° |
| 6 | D | D | D | 4.2 | 5000 | 7.8 | 0.43 | 0.35 | 0.03 | 0.38 | Hitting angle 3° |
| 7 | E | E | — | 2.4 | 3700 | 8.5 | 0.23 | 0.15 | 0.04 | 0.19 | Hitting angle 5° |
| 8 | F | F | — | 2.8 | 3500 | 5.8 | 0.28 | 0.74 | 0.03 | 0.77 | Hitting angle 5° |
| 9 | B | G | — | 3.2 | 6000 | 6.5 | 0.25 | 0.56 | 0.03 | 0.59 | Hitting angle 5° |
| 10 | A | H | — | 2.7 | 7000 | 5.8 | 0.21 | 0.15 | 0.04 | 0.19 | Hitting angle 5° |
| 11 | I | I | — | 2.8 | 3000 | 6.2 | 0.28 | 0.18 | 0.02 | 0.20 | Hitting angle 5° |
| 12 | B | G | — | 3.2 | 6000 | 6.5 | 0.25 | 0.56 | 0.05 | 0.61 | Without equalizing function |
| 13 | B | G | — | 3.2 | 6000 | 6.5 | 0.25 | 0.56 | 0.21 | 0.77 | Core misalignment 1 mm |
| 14 | B | G | — | 3.2 | 6000 | 6.5 | 0.25 | 0.56 | 0.44 | 1.00 | Hitting angle 4° |
| 15 | B | G | — | 3.2 | 6000 | 6.5 | 0.25 | 0.56 | 0.02 | 0.58 | Clearance 2 mm |
| 16 | B | G | — | 3.2 | 6000 | 6.5 | 0.25 | 0.56 | 0.82 | 1.38 | Clearance 1 mm |
| 1a | A | A | — | 4.0 | 3000 | 7.8 | 0.40 | 3.15 | 0.58 | 3.73 | Hitting angle 5° |
| 2a | B | B | — | 3.2 | 3500 | 6.9 | 0.35 | 2.33 | 0.07 | 2.40 | Hitting angle 5° |

TABLE 2-continued

| | Steel sheet combination | | | Total sheet thickness t [mm] | Welding pressure [N] | Electric current [kA] | Energization time [sec] | Hold time Ht [sec] | Squeeze time St [sec] | Ht + St [sec] | Disturbance factor |
|---|---|---|---|---|---|---|---|---|---|---|---|
| No. | First sheet | Second sheet | Third sheet | | | | | | | | |
| 3a | B | B | — | 3.2 | 3500 | 7.8 | 0.35 | 4.45 | 0.08 | 4.53 | Hitting angle 5° |
| 4a | C | C | — | 2.4 | 4000 | 6.5 | 0.25 | 2.22 | 0.02 | 2.24 | Hitting angle 5° |
| 5a | C | C | — | 2.4 | 4000 | 8.3 | 0.25 | 1.78 | 0.55 | 2.33 | Hitting angle 5° |
| 6a | D | D | D | 4.2 | 5000 | 7.8 | 0.43 | 3.42 | 0.89 | 4.31 | Hitting angle 3° |
| 10a | A | H | — | 2.7 | 7000 | 5.8 | 0.21 | 2.05 | 0.02 | 2.07 | Hitting angle 4° |
| 11a | I | I | — | 2.8 | 3000 | 6.2 | 0.28 | 2.05 | 0.03 | 2.08 | Hitting angle 4° |
| 12a | B | G | — | 3.2 | 6000 | 6.5 | 0.25 | 2.35 | 0.45 | 2.30 | Without equalizing function |
| 13a | B | G | — | 3.2 | 6000 | 6.5 | 0.25 | 2.35 | 0.15 | 2.50 | Core misalignment 1 mm |
| 14a | B | G | — | 3.2 | 6000 | 6.5 | 0.25 | 2.35 | 0.12 | 2.47 | Hitting angle 4° |
| 15a | B | G | — | 3.2 | 6000 | 6.5 | 0.25 | 2.35 | 0.12 | 2.47 | Clearance 2 mm |
| 16a | B | G | — | 3.2 | 6000 | 6.5 | 0.25 | 2.35 | 0.02 | 2.37 | Clearance 1 mm |
| 1b | A | A | — | 4.0 | 3000 | 7.8 | 0.40 | 0.24 | 0.03 | 0.27 | Hitting angle 5° |
| 2b | B | B | — | 3.2 | 3500 | 6.9 | 0.35 | 0.16 | 0.03 | 0.19 | Hitting angle 5° |
| 3b | B | B | — | 3.2 | 3500 | 7.8 | 0.35 | 0.16 | 0.04 | 0.20 | Hitting angle 5° |
| 4b | C | C | — | 2.4 | 4000 | 6.5 | 0.25 | 0.08 | 0.05 | 0.13 | Hitting angle 5° |
| 5b | C | C | — | 2.4 | 4000 | 8.3 | 0.25 | 0.08 | 0.03 | 0.11 | Hitting angle 5° |
| 6b | D | D | D | 4.2 | 5000 | 7.8 | 0.43 | 0.22 | 0.12 | 0.34 | Hitting angle 3° |
| 7b | E | E | — | 2.4 | 3700 | 8.5 | 0.23 | 0.08 | 0.84 | 0.92 | Hitting angle 4° |
| 8b | F | F | — | 2.8 | 3500 | 5.8 | 0.28 | 0.08 | 0.45 | 0.53 | Hitting angle 4° |
| 9b | B | G | — | 3.2 | 6000 | 6.5 | 0.25 | 0.12 | 0.32 | 0.44 | Hitting angle 4° |
| 12b | B | G | — | 3.2 | 6000 | 6.5 | 0.25 | 0.06 | 0.13 | 0.19 | Without equalizing function |
| 13b | B | G | — | 3.2 | 6000 | 6.5 | 0.25 | 0.08 | 0.15 | 0.23 | Core misalignment 1 mm |
| 14b | B | G | — | 3.2 | 6000 | 6.5 | 0.25 | 0.14 | 0.22 | 0.36 | Hitting angle 4° |
| 15b | B | G | — | 3.2 | 6000 | 6.5 | 0.25 | 0.01 | 0.02 | 0.03 | Clearance 2 mm |
| 16b | B | G | — | 3.2 | 6000 | 6.5 | 0.25 | 0.02 | 0.03 | 0.05 | Clearance 1 mm |
| 1c | A | A | — | 4.0 | 3000 | 7.8 | 0.40 | 0.33 | 0.01 | 0.34 | Hitting angle 5° |
| 3c | B | B | — | 3.2 | 3500 | 7.8 | 0.35 | 0.67 | 0.00 | 0.67 | Clearance 2 mm |
| 10c | A | H | — | 2.7 | 7000 | 5.8 | 0.21 | 0.15 | 0.01 | 0.16 | Without equalizing function |
| 11c | I | I | — | 2.8 | 3000 | 6.2 | 0.28 | 0.07 | 0.01 | 0.08 | Core misalignment 1 mm |

Each obtained welded joint, was cut along the central line of the welded portion and the cross section was observed to determine whether or not cracking occurred. Further, the cross tensile strength (CTS) of each spot welded joint was measured by the method defined according to JIS Z 3137 under the same welding conditions. In Table 3, the results of the lower limit of the hold time Ht after welding (Ht mm) defined by Expression 2, the absolute maximum value of "the bold time Ht+the squeeze time St" defined by Expression 3 (Ht+St max), and the occurrence of cracking, CTS and a welded joint strength ratio are shown.

The welded joint strength ratio is a ratio of a spot welded joint formed under the same welding conditions other than the hold time Ht after welding or the squeeze time St and the same disturbance factors based on CTS. For example, the welded joint strength ratio of No. 1a is a numerical value obtained by subtracting CTS of No. 1a from CTS of No. 1 having a spot welded joint formed under the same welding conditions other than the hold time Ht after welding and dividing the obtained value with CTS of No. 1 and multiplying the obtained value by 100. In the same manner, the welded joint strength ratio of No. 2b is a value calculated based on CTS of No. 2. In a case where the welded joint strength ratio was 30% or more, it was determined that CTS was decreased.

TABLE 3

| No. | Ht min [sec] | Ht + St max [sec] | Occurrence of cracking | CTS [kN] | Welding joint strength ratio |
|---|---|---|---|---|---|
| 1 | 0.26 | 3.10 | Not occurred | 11.5 | — |
| 2 | 0.17 | 2.27 | Not occurred | 8.9 | — |
| 3 | 0.17 | 2.27 | Not occurred | 10.5 | — |
| 4 | 0.11 | 1.69 | Not occurred | 6.8 | — |
| 5 | 0.11 | 1.69 | Not occurred | 8.7 | — |
| 6 | 0.28 | 3.35 | Not occurred | 9.5 | — |
| 7 | 0.11 | 1.69 | Not occurred | 6.8 | — |
| 8 | 0.14 | 1.95 | Not occurred | 5.8 | — |
| 9 | 0.17 | 2.27 | Not occurred | 10.5 | — |
| 10 | 0.13 | 1.88 | Not occurred | 3.4 | — |
| 11 | 0.14 | 1.95 | Not occurred | 6.4 | — |
| 12 | 0.17 | 2.27 | Not occurred | 10.3 | — |
| 13 | 0.17 | 2.27 | Not occurred | 9.5 | — |
| 14 | 0.17 | 2.27 | Not occurred | 10.8 | — |
| 15 | 0.17 | 2.27 | Not occurred | 10.2 | — |
| 16 | 0.17 | 2.27 | Not occurred | 10.4 | — |
| 1a | 0.26 | 3.10 | Not occurred | 6.4 | 44 |
| 2a | 0.17 | 2.27 | Not occurred | 5.3 | 40 |
| 3a | 0.17 | 2.27 | Not occurred | 6.7 | 36 |
| 4a | 0.11 | 1.69 | Not occurred | 3.4 | 50 |
| 5a | 0.11 | 1.69 | Not occurred | 5.3 | 39 |
| 6a | 0.28 | 3.35 | Not occurred | 6.2 | 35 |
| 10a | 0.13 | 1.88 | Not occurred | 2.1 | 38 |
| 11a | 0.14 | 1.95 | Not occurred | 3.4 | 47 |
| 12a | 0.17 | 2.27 | Not occurred | 5.9 | 44 |
| 13a | 0.17 | 2.27 | Not occurred | 6.1 | 42 |
| 14a | 0.17 | 2.27 | Not occurred | 6.4 | 39 |
| 15a | 0.17 | 2.27 | Not occurred | 6.7 | 36 |
| 16a | 0.17 | 2.27 | Not occurred | 7.2 | 31 |
| 1b | 0.26 | 3.10 | Occurred | 7.8 | 32 |
| 2b | 0.17 | 2.27 | Occurred | 8.3 | 7 |
| 3b | 0.17 | 2.27 | Occurred | 6.5 | 38 |
| 4b | 0.11 | 1.69 | Occurred | 5.9 | 13 |
| 5b | 0.11 | 1.69 | Occurred | 6.8 | 22 |

TABLE 3-continued

| No. | Ht min [sec] | Ht + St max [sec] | Occurrence of cracking | CTS [kN] | Welding joint strength ratio |
|---|---|---|---|---|---|
| 6b | 0.28 | 3.35 | Occurred | 5.3 | 44 |
| 7b | 0.11 | 1.69 | Occurred | 6.8 | 0 |
| 8b | 0.14 | 1.95 | Occurred | 5.6 | 0 |
| 9b | 0.17 | 2.27 | Occurred | 10.3 | 0 |
| 12b | 0.17 | 2.27 | Occurred | 5.8 | 45 |
| 13b | 0.17 | 2.27 | Occurred | 8.3 | 31 |
| 14b | 0.17 | 2.27 | Occurred | 9.5 | 10 |
| 15b | 0.17 | 2.27 | Occurred | 6.2 | 41 |
| 16b | 0.17 | 2.27 | Occurred | 7.5 | 29 |
| 1c | 0.26 | 3.10 | Occurred | 6.5 | 43 |
| 3c | 0.17 | 2.27 | Occurred | 2.3 | 76 |
| 10c | 0.13 | 1.88 | Occurred | 3.2 | 6 |
| 11c | 0.14 | 1.95 | Occurred | 3.8 | 41 |

As seen from Table 3, in the results of Nos. 1 to 16, 1a to 6a, and 10a to 16a, cracking does not occur right outside the corona bond and at the nugget boundary of the corona bond. It is considered that this is because the squeeze time St satisfies Expression 1 and the relationship between the total sheet thickness t and the hold time Ht after welding satisfies Expression 2.

In contrast, in Nos. 1b to 9b and 12b to 16b, cracking occurred right outside the corona bond or at the nugget boundary of the corona bond. Due to the cracking, CTS was sometimes decreased. It is considered that this is because the relationship between the total sheet thickness t and the hold time Ht after welding does not satisfy Expression 2.

In addition, in Nos. 1c, 3c, 10c and 11c, it is found that cracking occurs right outside the corona bond or at the nugget boundary of the corona bond and sufficient CTS is not obtained. It is considered that this is because the squeeze time St does not satisfy Expression 1. In the test example of No. 11c, the squeeze time St does not satisfy Expression 1 and the relationship between the total sheet thickness t and the hold time Ht after welding does not satisfy Expression 2.

In the results of Nos. 1a to 6a and 10a to 16a, while cracking was not confirmed right outside the corona bond or at the nugget boundary of the corona bond, the joint strength ratio tended to increase and CTS tended to decrease compared to Nos. 1 to 16. It is considered that this is because the relationship between the total sheet thickness t and "hold time Ht after welding+squeeze time St" does not satisfy Expression 3.

Example 2

The steel sheet A used in the tests is shown in Table 4. The steel sheet A is a galvannealed steel sheet, and both surfaces thereof are galvanized. The coating layer and the coating layer composition of galvannealing applied to the steel sheet A are the same as in Example 1.

As shown in Table 5, with respect to combinations of two steel sheets A, under various welding conditions and disturbance factors, spot welding was performed using a servo gun type welding machine. In addition, in every spot welding, a copper electrode of a dome radius type with a front end radius of 40 (mm) having a front end diameter of 8 (mm) was used for welding. During pressing, the welding pressure was not changed.

TABLE 4

| Steel Sheet | Kind of steel | Strength class | Sheet thickness [mm] | Amount of C [mass %] | Ceq | Plating |
|---|---|---|---|---|---|---|
| A | Cold rolled | 1180 MPa | 1.2 | 0.150 | 0.25 | Zinc |

Ceq = [C] + [Si]/30 + [Mn]/20 + 2[P] + 4[S]
[C], [Si], [Mn], [P], and[S] represent amounts (% by mass) of C, Si, P, and S.

TABLE 5

| | Steel sheet combination | | Total sheet | Welding | Pre-energization | | First cooling | Main welding | |
|---|---|---|---|---|---|---|---|---|---|
| No. | First sheet | Second sheet | thickness t [mm] | pressure [N] | Electric current [kA] | Energization time [sec] | time tc1 [sec] | Electric current [kA] | Energization time [sec] |
| 1 | A | A | 2.4 | 4000 | 5.3 | 0.250 | 0.120 | 6.6 | 0.300 |
| 2 | A | A | 2.4 | 4000 | — | — | — | 6.6 | 0.400 |
| 3 | A | A | 2.4 | 4000 | 5.3 | 0.250 | 0.120 | 6.6 | 0.400 |
| 4 | A | A | 2.4 | 4000 | 5.3 | 0.250 | 0.120 | 6.8 | 0.400 |
| 5 | A | A | 2.4 | 4000 | 5.3 | 0.250 | 0.120 | 7.5 | 0.400 |
| 6 | A | A | 2.4 | 4000 | 5.3 | 0.250 | 0.120 | 8.1 | 0.400 |
| 7 | A | A | 2.4 | 4000 | 5.3 | 0.250 | 0.120 | 6.4 | 0.400 |
| 8 | A | A | 2.4 | 4000 | 5.3 | 0.250 | 0.120 | 6.8 | 0.400 |
| 1a | A | A | 2.4 | 4000 | 5.3 | 0.250 | 0.120 | 6.6 | 0.300 |
| 2a | A | A | 2.4 | 4000 | — | — | — | 6.6 | 0.400 |
| 3a | A | A | 2.4 | 4000 | 5.3 | 0.250 | 0.120 | 6.6 | 0.400 |
| 4a | A | A | 2.4 | 4000 | 5.3 | 0.250 | 0.120 | 6.8 | 0.400 |
| 5a | A | A | 2.4 | 4000 | 5.3 | 0.250 | 0.120 | 7.5 | 0.400 |
| 6a | A | A | 2.4 | 4000 | 5.3 | 0.250 | 0.120 | 8.1 | 0.400 |
| 7a | A | A | 2.4 | 4000 | 5.3 | 0.250 | 0.120 | 6.4 | 0.400 |
| 8a | A | A | 2.4 | 4000 | 5.3 | 0.250 | 0.120 | 6.8 | 0.400 |
| 1b | A | A | 2.4 | 4000 | 5.3 | 0.250 | 0.120 | 6.6 | 0.300 |
| 2b | A | A | 2.4 | 4000 | — | — | — | 6.6 | 0.400 |
| 3b | A | A | 2.4 | 4000 | 5.3 | 0.250 | 0.120 | 6.6 | 0.400 |
| 4b | A | A | 2.4 | 4000 | 5.3 | 0.250 | 0.120 | 6.8 | 0.400 |
| 5b | A | A | 2.4 | 4000 | 5.3 | 0.250 | 0.120 | 7.5 | 0.400 |
| 6b | A | A | 2.4 | 4000 | 5.3 | 0.250 | 0.120 | 8.1 | 0.400 |
| 7b | A | A | 2.4 | 4000 | 5.3 | 0.250 | 0.120 | 6.4 | 0.400 |
| 8b | A | A | 2.4 | 4000 | 5.3 | 0.250 | 0.120 | 6.8 | 0.400 |
| 1c | A | A | 2.4 | 4000 | 5.3 | 0.250 | 0.120 | 6.6 | 0.300 |
| 2c | A | A | 2.4 | 4000 | — | — | — | 6.6 | 0.400 |
| 3c | A | A | 2.4 | 4000 | 5.3 | 0.250 | 0.120 | 6.6 | 0.400 |
| 4c | A | A | 2.4 | 4000 | 5.3 | 0.250 | 0.120 | 6.8 | 0.400 |

TABLE 5-continued

| | | | | | | | | | | |
|---|---|---|---|---|---|---|---|---|---|---|
| 5c | A | A | 2.4 | 4000 | 5.3 | 0.250 | | 0.120 | 7.5 | 0.400 |
| 6c | A | A | 2.4 | 4000 | 5.3 | 0.250 | | 0.120 | 8.1 | 0.400 |
| 7c | A | A | 2.4 | 4000 | 5.3 | 0.250 | | 0.120 | 6.4 | 0.400 |
| 8c | A | A | 2.4 | 4000 | 5.3 | 0.250 | | 0.120 | 6.8 | 0.400 |

| No. | Second cooling time tc2 [sec] | Post energization Electric current [kA] | Post energization Energization time [sec] | Hold time Ht [sec] | Squeeze time St [sec] | Ht + St [sec] | Disturbance Factor |
|---|---|---|---|---|---|---|---|
| 1 | — | — | — | 0.240 | 0.020 | 0.260 | Hitting angle 5° |
| 2 | 0.080 | 6.1 | 0.100 | 0.120 | 0.030 | 0.150 | Hitting angle 5° |
| 3 | 0.060 | 6.1 | 0.240 | 0.640 | 0.050 | 0.690 | Hitting angle 5° |
| 4 | 0.060 | 6.1 | 0.240 | 0.200 | 0.020 | 0.220 | Without equalizing function |
| 5 | 0.060 | 6.1 | 0.240 | 0.480 | 0.040 | 0.520 | Core misalignment 1 mm |
| 6 | 0.060 | 6.1 | 0.240 | 0.560 | 0.060 | 0.620 | Hitting angle 4° |
| 7 | 0.060 | 6.1 | 0.240 | 0.640 | 0.030 | 0.670 | Clearance 2 mm |
| 8 | 0.060 | 6.1 | 0.240 | 0.150 | 0.330 | 0.480 | Clearance 1 mm |
| 1a | — | — | — | 1.790 | 0.020 | 1.810 | Hitting angle 5° |
| 2a | 0.080 | 6.1 | 0.100 | 1.780 | 0.050 | 1.830 | Hitting angle 5° |
| 3a | 0.060 | 6.1 | 0.240 | 2.050 | 0.520 | 2.570 | Hitting angle 5° |
| 4a | 0.060 | 6.1 | 0.240 | 2.080 | 0.120 | 2.200 | Without equalizing function |
| 5a | 0.060 | 6.1 | 0.240 | 2.020 | 0.250 | 2.270 | Core misalignment 1 mm |
| 6a | 0.060 | 6.1 | 0.240 | 1.880 | 0.220 | 2.100 | Hitting angle 4° |
| 7a | 0.060 | 6.1 | 0.240 | 1.780 | 0.050 | 1.830 | Clearance 2 mm |
| 8a | 0.060 | 6.1 | 0.240 | 1.890 | 0.030 | 1.920 | Clearance 1 mm |
| 1b | — | — | — | 0.050 | 0.020 | 0.070 | Hitting angle 5° |
| 2b | 0.080 | 6.1 | 0.100 | 0.040 | 0.050 | 0.090 | Hitting angle 5° |
| 3b | 0.060 | 6.1 | 0.240 | 0.080 | 0.030 | 0.110 | Hitting angle 5° |
| 4b | 0.060 | 6.1 | 0.240 | 0.090 | 0.070 | 0.160 | Without equalizing function |
| 5b | 0.060 | 6.1 | 0.240 | 0.040 | 0.130 | 0.170 | Core misalignment 1 mm |
| 6b | 0.060 | 6.1 | 0.240 | 0.020 | 0.220 | 0.240 | Hitting angle 4° |
| 7b | 0.060 | 6.1 | 0.240 | 0.080 | 0.020 | 0.100 | Clearance 2 mm |
| 8b | 0.060 | 6.1 | 0.240 | 0.060 | 0.250 | 0.310 | Clearance 1 mm |
| 1c | — | — | — | 0.240 | 0.010 | 0.250 | Hitting angle 5° |
| 2c | 0.080 | 6.1 | 0.100 | 0.120 | 0.010 | 0.130 | Hitting angle 5° |
| 3c | 0.060 | 6.1 | 0.240 | 0.640 | 0.010 | 0.650 | Hitting angle 5° |
| 4c | 0.060 | 6.1 | 0.240 | 0.200 | 0.005 | 0.205 | Without equalizing function |
| 5c | 0.060 | 6.1 | 0.240 | 0.480 | 0.010 | 0.490 | Core misalignment 1 mm |
| 6c | 0.060 | 6.1 | 0.240 | 0.560 | 0.005 | 0.565 | Hitting angle 4° |
| 7c | 0.060 | 6.1 | 0.240 | 0.640 | 0.010 | 0.650 | Clearance 2 mm |
| 8c | 0.060 | 6.1 | 0.240 | 0.100 | 0.015 | 0.115 | Clearance 1 mm |

In the same method as in Example 1, confirmation of the occurrence of cracking in the spot welding joint and measurement of CTS were performed. In Table 6, the lower limit of the hold time Ht after welding (Ht min) defined by Expression 2, the absolute maximum value of "the sum of hold time Ht and the squeeze time St" (Ht+St max) defined by Expression 3, the occurrence of cracking, CTS, and the welded joint strength ratio are shown. In a case where the welded joint strength ratio was 30% or more, it was determined that CTS was decreased.

TABLE 6

| No. | Ht min [sec] | Ht + St max [sec] | Occurrence of cracking | CTS [kN] | Welding joint strength ratio |
|---|---|---|---|---|---|
| 1 | 0.11 | 1.69 | Not occurred | 6.9 | — |
| 2 | 0.11 | 1.69 | Not occurred | 8.9 | — |
| 3 | 0.11 | 1.69 | Not occurred | 9.2 | — |
| 4 | 0.11 | 1.69 | Not occurred | 8.7 | — |
| 5 | 0.11 | 1.69 | Not occurred | 8.5 | — |
| 6 | 0.11 | 1.69 | Not occurred | 8.8 | — |
| 7 | 0.11 | 1.69 | Not occurred | 7.1 | — |
| 8 | 0.11 | 1.69 | Not occurred | 6.8 | — |
| 1a | 0.11 | 1.69 | Not occurred | 3.4 | 51 |
| 2a | 0.11 | 1.69 | Not occurred | 5.7 | 36 |
| 3a | 0.11 | 1.69 | Not occurred | 6.8 | 26 |
| 4a | 0.11 | 1.69 | Not occurred | 5.4 | 38 |
| 5a | 0.11 | 1.69 | Not occurred | 5.2 | 39 |
| 6a | 0.11 | 1.69 | Not occurred | 5.4 | 39 |
| 7a | 0.11 | 1.69 | Not occurred | 4.3 | 39 |
| 8a | 0.11 | 1.69 | Not occurred | 4.7 | 31 |
| 1b | 0.11 | 1.69 | Occurred | 4.2 | 39 |
| 2b | 0.11 | 1.69 | Occurred | 4.1 | 54 |
| 3b | 0.11 | 1.69 | Occurred | 2.5 | 73 |
| 4b | 0.11 | 1.69 | Occurred | 2.8 | 68 |
| 5b | 0.11 | 1.69 | Occurred | 3.8 | 55 |
| 6b | 0.11 | 1.69 | Occurred | 5.2 | 41 |
| 7b | 0.11 | 1.69 | Occurred | 4.5 | 37 |
| 8b | 0.11 | 1.69 | Occurred | 3.7 | 46 |
| 1c | 0.11 | 1.69 | Occurred | 3.8 | 45 |
| 2c | 0.11 | 1.69 | Occurred | 8.0 | 10 |
| 3c | 0.11 | 1.69 | Occurred | 2.5 | 73 |
| 4c | 0.11 | 1.69 | Occurred | 3.8 | 56 |
| 5c | 0.11 | 1.69 | Occurred | 4.5 | 47 |
| 6c | 0.11 | 1.69 | Occurred | 5.6 | 36 |
| 7c | 0.11 | 1.69 | Occurred | 4.1 | 42 |
| 8c | 0.11 | 1.69 | Occurred | 3.8 | 44 |

As shown in Table 6, in the results of Nos. 1 to 8 and 1a to 8a, cracking does not occur right outside the corona bond and at the nugget boundary of the corona bond. It is considered that this is because the squeeze time St satisfies Expression 1 and the relationship between the total sheet thickness t and the hold time Ht after welding satisfies Expression 2.

In contrast, in Nos. 1b to 8b, cracking occurred right outside the corona bond or at the nugget boundary of the corona bond. It is considered that this is because the relationship between the total sheet thickness t and the hold time Ht after welding does not satisfy Expression 2.

In addition, in Nos. 1c to 8c, cracking occurred right outside the corona bond or at the nugget boundary of the corona bond. It is considered that this is because the squeeze time St does not satisfy Expression 1. In the test example of No. 8c, the squeeze time St does not satisfy Expression 1 and the relationship between the total sheet thickness t and the hold time Ht after welding does not satisfy Expression 2.

In the results of Nos. 1a to 8a, while cracking was not confirmed right outside the corona bond or at the nugget boundary of the corona bond, the joint strength ratio tended to increase and CTS tended to decrease compared to Nos. 1 to 8. It is considered that this is because the relationship between the total sheet thickness t and "hold time Ht after welding+squeeze time St" does not satisfy Expression 3.

Figure 10:
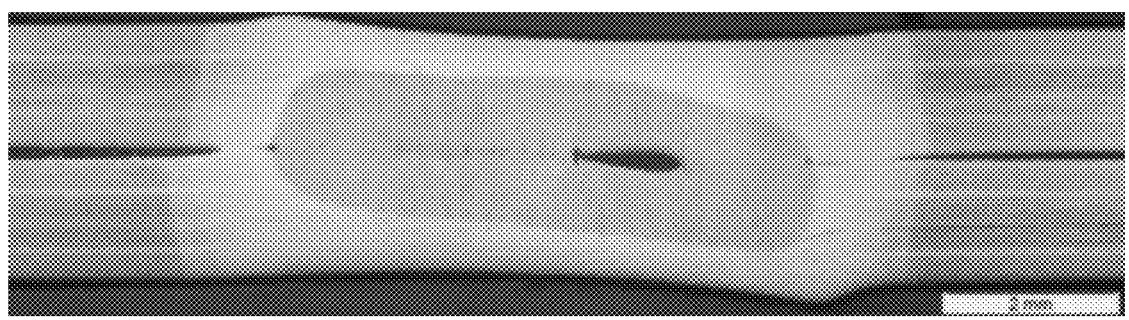
FIG. 10 is a cross-sectional photograph of a welding zone at which spot welding is performed in a state in which the axial core of the welding electrode and the perpendicular line of the surface of the steel sheet that is brought into contact with the welding electrode are not parallel with each other.

Next, the deformation aspects of the welding zone by each disturbance factor will be described. FIG. 10 is a cross section photograph obtained by taking the cross section of the steel sheets at a welding zone spot-welded at a hitting angle of 5 degrees in the sheet thickness direction with an optical microscope. It is found that by providing the hitting angle, the deformation aspects of the steel sheets on the right and left sides of the nugget are different.

Figure 11:
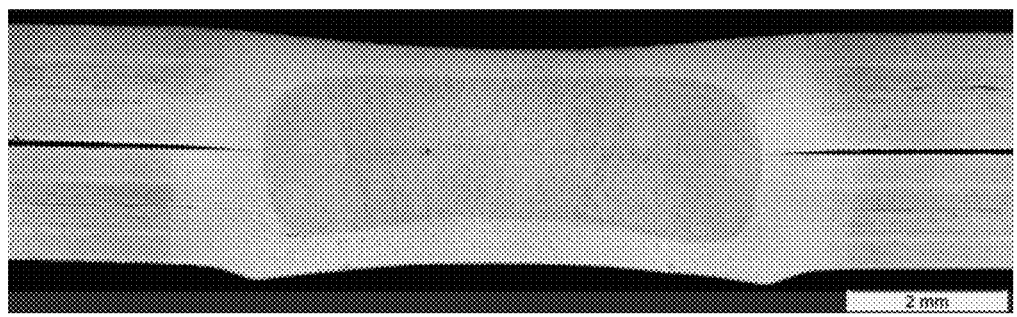
FIG. 11 is a cross-sectional photograph of a welding zone at which spot welding is performed in a state in which the respective distances from each front end section of the facing welding electrodes to the surface of each steel sheet are different.

FIG. 11 is a cross section photograph in a case where spot welding is performed by providing a 1 mm clearance between the steel sheets and the electrodes without providing an equalizing mechanism. At the welding zone, it is found that the deformation aspects of the lower steel sheet and the upper steel sheet are different.

Figure 12:
FIG. 12 is a cross-sectional photograph of a welding zone at which spot welding is performed in a state in which the axial core of the other welding electrode is shifted from the extended line of the axial core of one welding electrode.

FIG. 12 is a cross section photograph in a case where spot welding is performed in a state in which the axial cores of the welding electrodes are shifted from each other by 1.5 mm. It is found that the upper and lower indentations are asymmetric.

Figure 13:
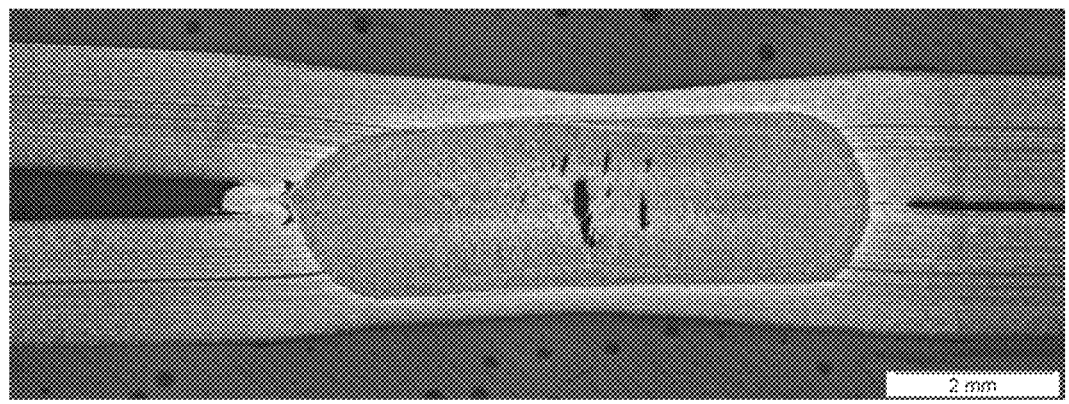
FIG. 13 is a cross-sectional photograph of a welding zone at which spot welding is performed in a state in which a gap is provided between the overlapped faces at the welding zone.

FIG. 13 is a cross section photograph in a case where spot welding is performed in a state in which a sheet gap with a height of 2 mm is formed in a location 20 mm apart from the spot of one of the overlapped faces at the welding zone. It is found that the deformation aspects of the left and right sides of the nugget are different.

INDUSTRIAL APPLICABILITY

According to the present invention, since the hold time after welding of the welding electrodes is used as a function of the total sheet thickness in the spot welding, cracking right outside the corona bond and at the nugget boundary of the corona bond can be suppressed and the joint strength can be secured. Particularly, the present invention relates to a spot welding method for a plurality of steel sheets including high strength zinc-plated steel sheets for automobiles, having a direct influence on joint strength, and capable of preventing liquid metal cracking occurring right outside the corona bond and at the nugget boundary of the corona bond at the overlapped faces of the steel sheets and securing joint strength. Thus, the present invention has high industrial applicability.

BRIEF DESCRIPTION OF THE REFERENCE SYMBOLS

1 STEEL SHEET
2 NUGGET
3 CRACKING THAT PROPAGATES FROM SURFACE Of STEEL SHEET TO NUGGET
4 HEAT AFFECTED ZONE
5 CRACKING THAT PROPAGATES FROM SHOULDER PORTION TO HEAT AFFECTED ZONE
6 CRACKING RIGHT OUTSIDE CORONA BOND
7 CRACKING AT NUGGET BOUNDARY OF CORONA BOND
8 WELDING ELECTRODE
9 AXIAL CORE
10 PERPENDICULAR LINE
11 ANOTHER MEMBER
Dc CORONA BOND DIAMETER

What is claimed is:

1. A spot welding method for a member to be welded constituted of a plurality of steel sheets that are overlapped at least at a welding zone,
   wherein the member to be welded includes at least one steel sheet which is coated with zinc plating at at least an overlapped face at the welding zone, and a total sheet thickness t (mm) of the plurality of steel sheets is 2.4 mm or more,
   a squeeze time St (seconds) from when welding electrodes are brought into contact with the member to be welded to when electric current flow for welding starts satisfies Expression 1, and a hold time Ht (seconds) after welding from when electric current flow for welding between the welding electrodes ends to when the welding electrodes and the member to be welded are brought out of contact satisfies Expression 2, and
   wherein immediately before the welding electrodes are brought into contact with the member to be welded, one or two or more of the following conditions (a) to (d) are satisfied;
   (a) a state in which an axial core of the welding electrode and a perpendicular line of a surface of the steel sheet that is brought into contact with the welding electrode are not parallel with each other;
   (b) a state in which a distance from a front end section of one welding electrode to a surface of one steel sheet and a distance from a front end section of the other welding electrode to a surface of the other steel sheet are different from each other;
   (c) a state in which an axial core of the other welding electrode is shifted from an extended line of an axial core of one welding electrode; and
   (d) a state in which a gap is provided between the overlapped faces at the welding zone, $$0.020 \leq St \quad \text{(Expression 1)}$$

$$0.015t^2 + 0.020 \leq Ht \quad \text{(Expression 2).}$$

2. The spot welding method according to claim 1,
   wherein the hold time Ht (seconds) after welding and the squeeze time St (seconds) further satisfy Expression 3, $$Ht + St \leq 0.20t^2 - 0.40t + 1.50 \quad \text{(Expression 3).}$$

3. The spot welding method according to claim 2,
   wherein at least one of the plurality of steel sheets is a high strength steel sheet having a tensile strength of 780 MPa or more.

4. The spot welding method according to claim 3,
   wherein pre-energizing is performed and a start time of the electric current flow for welding is an energization start time of the pre-energizing,
   wherein the pre-energizing is a state wherein an electric current value is 0.4 to 1 times an electric current for welding that is held for 20 msec or longer.

5. The spot welding method according to claim 3,
wherein post energizing is performed and an end time of the electric current flow for welding is an energization end time of the post energizing,
wherein the post energizing is a state wherein an electric current value is 0.6 to 1 times an electric current for welding that is held for 1 to 500 msec.

6. The spot welding method according to claim 3,
wherein pre-energizing is performed and a start time of the electric current flow for welding is an energization start time of the pre-energizing, and
post energizing is performed and an end time of the electric current flow for welding is an energization end time of the post energizing,
wherein the pre-energizing is a state wherein an electric current value is 0.4 to 1 times an electric current for welding that is held for 20 msec or longer and the post energizing is a state wherein an electric current value is 0.6 to 1 times an electric current for welding that is held for 1 to 500 msec.

7. The spot welding method according to claim 2,
wherein pre-energizing is performed and a start time of the electric current flow for welding is an energization start time of the pre-energizing,
wherein the pre-energizing is a state wherein an electric current value is 0.4 to 1 times an electric current for welding that is held for 20 msec or longer.

8. The spot welding method according to claim 2,
wherein post energizing is performed and an end time of the electric current flow for welding is an energization end time of the post energizing,
wherein the post energizing is a state wherein an electric current value is 0.6 to 1 times an electric current for welding that is held for 1 to 500 msec.

9. The spot welding method according to claim 2,
wherein pre-energizing is performed and a start time of the electric current flow for welding is an energization start time of the pre-energizing, and
post energizing is performed and an end time of the electric current flow for welding is an energization end time of the post energizing,
wherein the pre-energizing is a state wherein an electric current value is 0.4 to 1 times an electric current for welding that is held for 20 msec or longer and the post energizing is a state wherein an electric current value is 0.6 to 1 times an electric current for welding that is held for 1 to 500 msec.

10. The spot welding method according to claim 1,
wherein at least one of the plurality of steel sheets is a high strength steel sheet having a tensile strength of 780 MPa or more.

11. The spot welding method according to claim 10,
wherein pre-energizing is performed and a start time of the electric current flow for welding is an energization start time of the pre-energizing,
wherein the pre-energizing is a state wherein an electric current value is 0.4 to 1 times an electric current for welding that is held for 20 msec or longer.

12. The spot welding method according to claim 10,
wherein post energizing is performed and an end time of the electric current flow for welding is an energization end time of the post energizing,
wherein the post energizing is a state wherein an electric current value is 0.6 to 1 times an electric current for welding that is held for 1 to 500 msec.

13. The spot welding method according to claim 10,
wherein pre-energizing is performed and a start time of the electric current flow for welding is an energization start time of the pre-energizing, and
post energizing is performed and an end time of the electric current flow for welding is an energization end time of the post energizing,
wherein the pre-energizing is a state wherein an electric current value is 0.4 to 1 times an electric current for welding that is held for 20 msec or longer and the post energizing is a state wherein an electric current value is 0.6 to 1 times an electric current for welding that is held for 1 to 500 msec.

14. The spot welding method according to claim 1,
wherein pre-energizing is performed and a start time of the electric current flow for welding is an energization start time of the pre-energizing,
wherein the pre-energizing is a state wherein an electric current value is 0.4 to 1 times an electric current for welding that is held for 20 msec or longer.

15. The spot welding method according to claim 1,
wherein post energizing is performed and an end time of the electric current flow for welding is an energization end time of the post energizing,
wherein the post energizing is a state wherein an electric current value is 0.6 to 1 times an electric current for welding that is held for 1 to 500 msec.

16. The spot welding method according to claim 1,
wherein pre-energizing is performed and a start time of the electric current flow for welding is an energization start time of the pre-energizing, and
post energizing is performed and an end time of the electric current flow for welding is an energization end time of the post energizing,
wherein the pre-energizing is a state wherein an electric current value is 0.4 to 1 times an electric current for welding that is held for 20 msec or longer and the post energizing is a state wherein an electric current value is 0.6 to 1 times an electric current for welding that is held for 1 to 500 msec.

* * * * *